(12) United States Patent
Yagi et al.

(10) Patent No.: US 8,830,046 B2
(45) Date of Patent: Sep. 9, 2014

(54) IN-VEHICLE DEVICE FOR RECORDING MOVING IMAGE DATA

(75) Inventors: Yoriko Yagi, Osaka (JP); Junichi Nakahashi, Nara (JP); Miho Tanji, Osaka (JP)

(73) Assignee: Panasonic Corporation, Osaka (JP)

( * ) Notice: Subject to any disclaimer, the term of this patent is extended or adjusted under 35 U.S.C. 154(b) by 967 days.

(21) Appl. No.: 12/947,623

(22) Filed: Nov. 16, 2010

(65) Prior Publication Data
US 2011/0057783 A1 Mar. 10, 2011

Related U.S. Application Data

(63) Continuation of application No. PCT/JP2009/002432, filed on Jun. 1, 2009.

(30) Foreign Application Priority Data

Jun. 20, 2008 (JP) ................................. 2008-161289

(51) Int. Cl.
| | |
|---|---|
| *B60Q 1/00* | (2006.01) |
| *G08G 1/16* | (2006.01) |
| *H04N 5/77* | (2006.01) |
| *H04N 5/232* | (2006.01) |
| *H04N 9/79* | (2006.01) |
| *G07C 5/08* | (2006.01) |
| *B60R 1/00* | (2006.01) |
| *H04N 9/804* | (2006.01) |

(52) U.S. Cl.
CPC .................. *G08G 1/16* (2013.01); *H04N 5/772* (2013.01); *H04N 5/23293* (2013.01); *H04N 9/7921* (2013.01); *G07C 5/085* (2013.01); *B60R 2300/303* (2013.01); *H04N 9/8047* (2013.01); *B60R 1/00* (2013.01); *G07C 5/0891* (2013.01); *G07C 5/0866* (2013.01); *B60R 2300/105* (2013.01)
USPC ......... 340/436; 340/937; 340/933; 340/539.1

(58) Field of Classification Search
USPC .......... 340/436, 937, 902, 903, 904, 905, 933
See application file for complete search history.

(56) References Cited

U.S. PATENT DOCUMENTS 6,324,450 B1 11/2001 Iwama
6,704,434 B1 3/2004 Sakoh et al.
(Continued)

FOREIGN PATENT DOCUMENTS

JP 10-116400 5/1998
JP 3080205 U 9/2001
(Continued)

*Primary Examiner* — Daryl Pope
(74) *Attorney, Agent, or Firm* — McDermott Will & Emery LLP

(57) ABSTRACT

A normal image quality coding unit generates normal-quality compressed moving image data by compressing moving image data generated by capturing an image around a vehicle with a normal image quality. A high image quality coding unit generates high-quality compressed moving image data by compressing the moving image data with an image quality higher than the normal image quality. The normal-quality compressed moving image data is recorded in a normal image quality data storage unit. A trigger detection unit detects an abnormal condition which possibly happens to the vehicle currently travelling. A high image quality data storage unit records therein the high-quality compressed moving image data based on a timing by which the abnormal condition is detected by the trigger detection unit.

15 Claims, 12 Drawing Sheets

(56) References Cited

U.S. PATENT DOCUMENTS

| | | |
|---|---|---|
| 7,088,387 B1 | 8/2006 | Freeman et al. |
| 2002/0005909 A1* | 1/2002 | Sato .............................. 348/559 |
| 2003/0095688 A1* | 5/2003 | Kirmuss ....................... 382/105 |
| 2007/0067079 A1 | 3/2007 | Kosugi |

FOREIGN PATENT DOCUMENTS

| | | |
|---|---|---|
| JP | 2006-302017 | 11/2006 |
| JP | 2007-088541 | 4/2007 |
| JP | 2007-124155 | 5/2007 |

* cited by examiner

F I G. 3
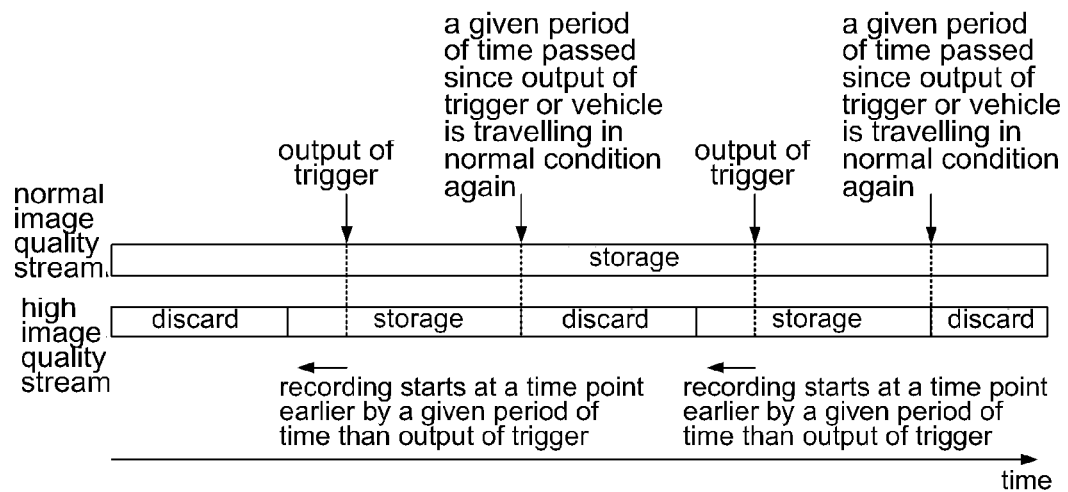

F I G. 7
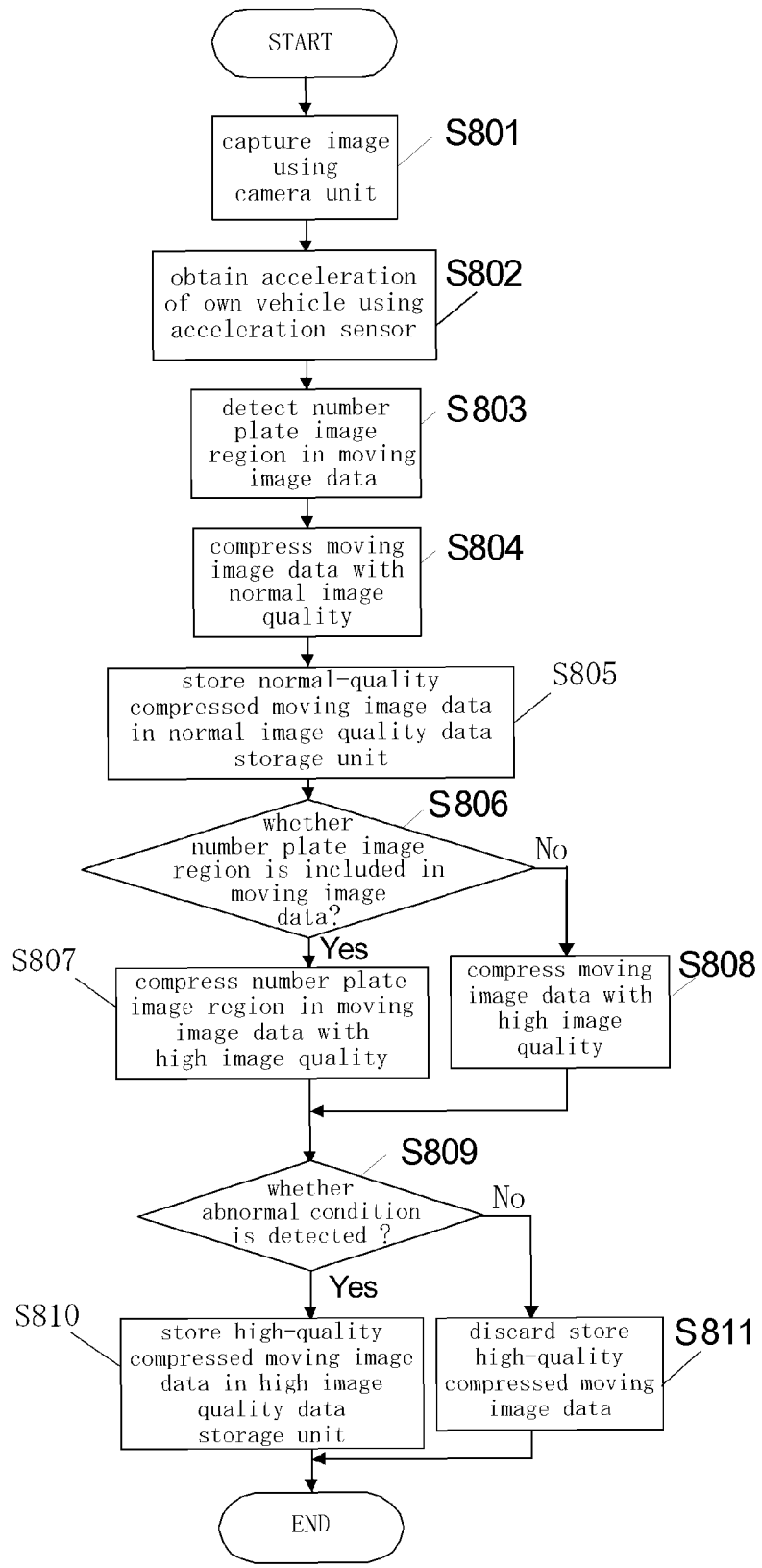

F I G. 9
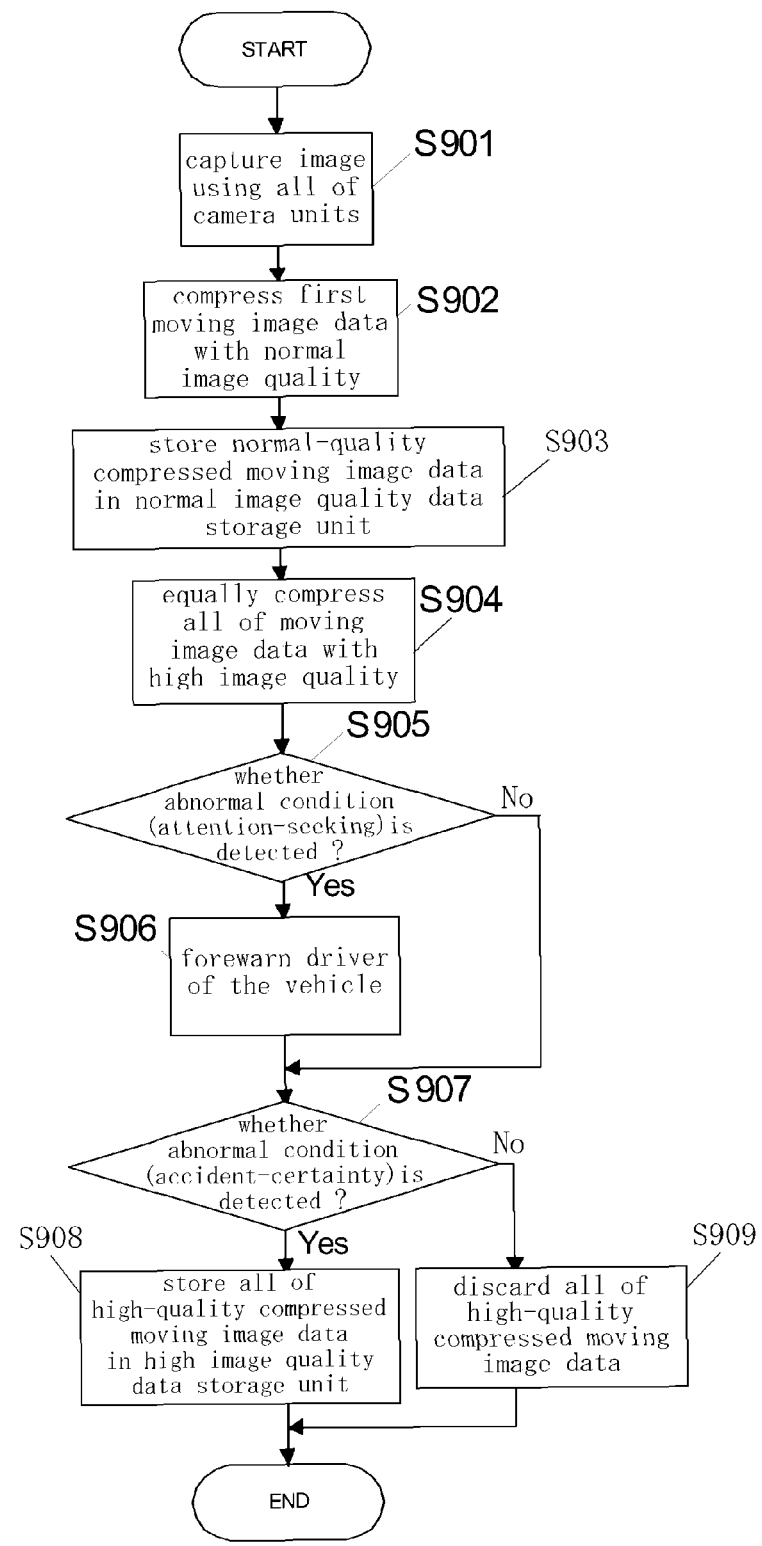

(12) United States Patent
US 8,830,046 B2

IN-VEHICLE DEVICE FOR RECORDING MOVING IMAGE DATA

CROSS-REFERENCE TO RELATED APPLICATION

This is a continuation of PCT International Application PCT/JP2009/002432 filed on Jun. 1, 2009, which claims priority to Japanese Patent Application No. 2008-161289 filed on Jun. 20, 2008. The disclosures of these applications including the specifications, the drawings, and the claims are hereby incorporated by reference in their entirety.

FIELD OF THE INVENTION

The present invention relates to an in-vehicle moving image data recording device which performs two different compression processes, which are normal image quality compression and high image quality compression, to an image inputted from a camera, and records high-quality image data when an abnormal condition is detected.

BACKGROUND OF THE INVENTION

There is an increasing demand in recent years for an in-vehicle moving image recording apparatus, called a drive recorder, also called an event data recorder which records the surrounding circumstances of a travelling vehicle to analyze an accident cause and recognize driving habits and tendency so that the analysis and information can be used for safe driving guidance. The in-vehicle moving image recording apparatus, which was initially developed for use in commercial vehicles such as taxis and large trucks, is now increasingly used in private cars as well.

The in-vehicle moving image recording apparatus often records moving image data with low image quality so that the data can be recorded as long as possible in a storage memory having a limited capacity. To look into the local circumstances of an accident and analyze what caused the accident, moving image data used for the purpose should have a high image quality to better analyze the accident cause.

A known conventional in-vehicle moving image recording apparatus is provided with a vehicle speed sensor to record moving image data with a higher image quality as a vehicle speed is higher (for example, see the Patent Document 1). Another known conventional in-vehicle moving image recording apparatus is provided with a vehicle proximity estimation device wherein a frame rate used to compress moving image data which is generally low is changed to a high frame rate in the event that another vehicle is approaching too close to the vehicle (for example, see the Patent Document 2).

PRIOR ART DOCUMENT

Patent Documents

Patent Document 1: Unexamined Japanese Patent Applications Laid-Open No. 2007-124155
Patent Document 2: Unexamined Japanese Patent Applications Laid-Open No. 2007-88541

SUMMARY OF THE INVENTION

Problem to be Solved by the Invention

The conventional in-vehicle moving image recording apparatus disclosed in the Patent Document 1, which records the high-quality moving image data only when the vehicle is running very fast, cannot obtain the high-quality moving image data at the occurrence of an accident when the vehicle is running at any normal speeds or pulled over.

The conventional in-vehicle moving image recording apparatus disclosed in the Patent Document 1 or 2 make changes to the structure of GOP, for example, changes the total number of P pictures in GOP or the total number of any pictures in GOP, or changes a current frame rate to a higher frame rate in order to record moving image data with high image quality. Notwithstanding these technical efforts to record the data with high image quality, the image quality is not particularly improved as compared to normal image quality recording as far as an image resolution remains the same.

The apparatus is equipped with a single camera unit in its front section or two camera units in its front and rear sections. In such an event that two cars approaching from the right and left of the camera collide with each other, one front camera or two front and back cameras thus vertically disposed may be insufficient to pick up necessary information even though the data recording is switched to the high image quality recording. Further, any really important scene cannot obtain a desirable image quality because images inputted from the camera are all compressed with an equal image quality whether they are the images of background information such as building which is relatively less important, or key objects such as vehicle, walking person, and traffic light.

A main object of the present invention is, therefore, to provide an in-vehicle moving image data recording apparatus wherein image data is recorded with low image quality when a vehicle is travelling in normal condition in view of an available storage capacity but is recorded with high image quality immediately after an accident occurs to photograph the circumstances of the accident location.

Means for Solving the Problem

An in-vehicle moving image data recording apparatus according to the present invention is an in-vehicle moving image data recording apparatus mounted in a vehicle, comprising:
a normal image quality coding unit for compressing moving image data generated from images of surroundings of the vehicle captured by a camera unit mounted in the vehicle with a normal image quality to generate a normal-quality compressed moving image data;
a high image quality coding unit for compressing the moving image data with an image quality higher than the normal image quality to generate a high-quality compressed moving image data;
a normal image quality data storage unit for recording therein the normal-quality compressed moving image data;
a trigger detecting unit for detecting an abnormal condition which possibly happens to the vehicle currently travelling; and
a high image quality data storage unit for recording therein the high-quality compressed moving image data based on a timing by which the abnormal condition is detected by the trigger detecting unit.

The high image quality coding unit according to the present invention preferably compresses the moving image data to have an image quality higher than the normal image quality in data setting of, for example, image codec, angle of view, frame rate, and bit rate. The high image quality data storage unit according to the present invention preferably records all of the high-quality compressed moving image data from a time point earlier by a given period of time than the detection timing onwards. The trigger detecting unit according to the present invention preferably detects at least one of; another vehicle in too proximity, walking person in too proximity, sudden braking, and physical impact on the own vehicle as the abnormal condition.

According to the present invention wherein the moving image data is recorded with the normal image quality unless any abnormal event occurs, the storage capacity can be efficiently used, and the moving image data with the high image quality can be obtained immediately after an accident occurs. Further, the images of the vehicle surroundings recorded with the high image quality can be obtained as soon as the occurrence of any abnormal event is detected, and the high-quality images can be obtained not only when the vehicle is travelling too fast but also when the vehicle is travelling in normal condition or pulled over. The high-quality compressed moving image data thus obtained has a better image quality than that of the normal-quality compressed moving image data in the set data such as image codec, angle of view, frame rate, and bit rate. Therefore, the moving image data thus obtained has a significantly improved image quality.

In the in-vehicle moving image data recording apparatus according to the present invention, the camera unit preferably includes a plurality of camera units which respectively capture images in different directions from the vehicle, wherein the high image quality coding unit compresses a plurality of the moving image data generated by the plurality of camera units with the high image quality to generate a plurality of the high-quality compressed moving image data, and the high image quality data storage unit records therein the plurality of the high-quality compressed moving image data based on the detection timing.

When the vehicle surroundings in thus different directions are photographed, the images can be recorded without overlooking any causative factors which led to the occurrence of an accident.

The in-vehicle moving image data recording apparatus according to the present invention preferably further comprises:

a number plate detecting unit for detecting a number plate image region including a number plate of another vehicle running near the vehicle in the moving image data; and an acceleration sensor unit for sensing an acceleration of the vehicle, wherein the number plate detecting unit performs motion prediction of the number plate based on the acceleration sensed by the acceleration sensor unit to detect the number plate image region based on the motion prediction, and the high image quality coding compresses the number plate image region with an image quality higher than the normal image quality to generate a high-quality compressed number plate image region as the high-quality compressed moving image data.

According to the apparatus thus structurally characterized, the number plate image region, which is particularly important among all of image regions in the moving image data obtained by the camera unit, can be more readily identified.

The in-vehicle moving image data recording apparatus according to the present invention preferably further comprises a danger forewarning unit which issues a warning to a driver of the vehicle depending on the abnormal condition detected by the trigger detecting unit. According to the apparatus thus structurally characterized, the driver can be forewarned of a possible accident.

The in-vehicle moving image data recording apparatus according to the present invention preferably further comprises a captured image display unit which displays the moving image data on a display screen. According to the apparatus thus structurally characterized, the driver can watch the images captured by the camera unit and displayed on the display screen to predict any possible danger, and should be able to take any necessarily action to avoid it.

Effect of the Invention

According to the in-vehicle moving image data recording apparatus provided by the present invention, the moving image data is recorded with normal image quality to fully use the available storage capacity, and the high image quality recording is selected after an accident happens to more easily identify and analyze what caused the accident through the high-quality images thus obtained.

BRIEF DESCRIPTION OF THE DRAWINGS

FIG. 3 is a conceptual rendering of storage and deletion of data with normal image quality and data with high image quality.

FIG. 7 is a flow chart illustrating an operation of the in-vehicle moving image data recording apparatus according to the exemplary embodiment 3.

FIG. 9 is a flow chart illustrating an operation of the in-vehicle moving image data recording apparatus according to the exemplary embodiment 4.

BEST MODES FOR CARRYING OUT THE INVENTION

Exemplary Embodiment 1

An exemplary embodiment 1 of the present invention describes an in-vehicle moving image data recording apparatus which performs two different compression processes, which are compression with normal image quality and compression with high image quality, to moving image data inputted from a camera unit, and records, when an abnormal condition is detected, a storage unit stores therein all of the moving image data compressed with high image quality from a time point earlier by a given period of time than a time point when the abnormal condition is detected onwards.

Figure 1A:
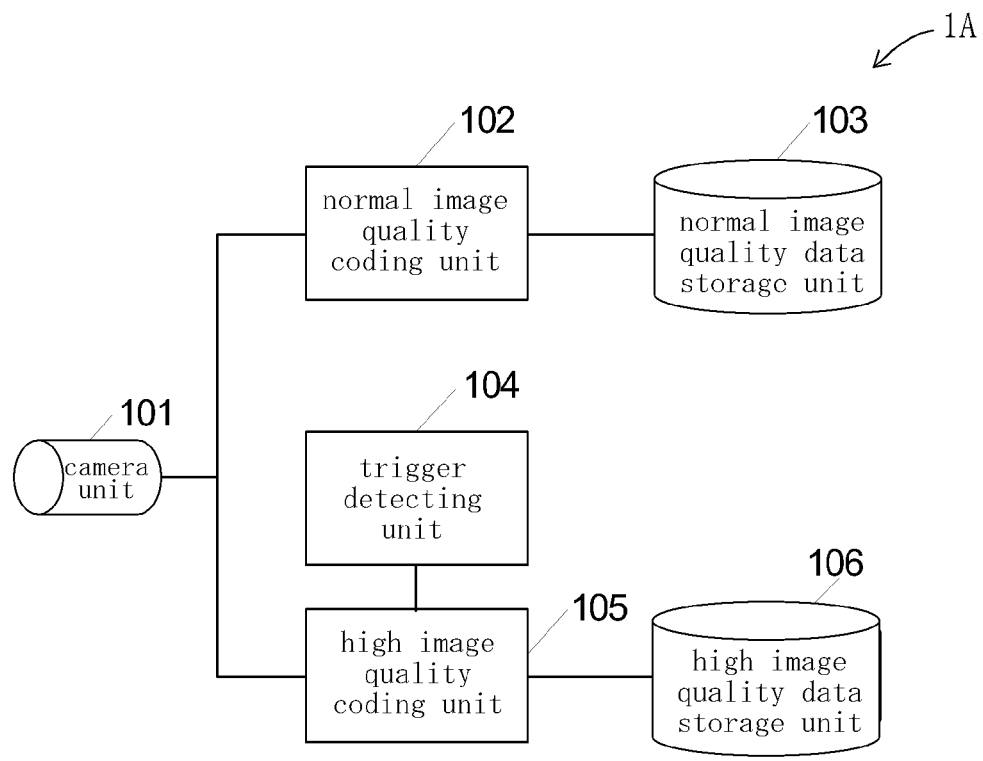
FIG. 1A is a block diagram illustrating a structure of an in-vehicle moving image data recording apparatus according to an exemplary embodiment 1 of the present invention.

FIG. 1A is a block diagram illustrating a structure of an in-vehicle moving image data recording apparatus 1A according to the present exemplary embodiment. The in-vehicle moving image data recording apparatus 1A is equipped with a camera unit 101, a normal image quality coding unit 102, a normal image quality data storage unit 103, a trigger detecting unit 104, a high image quality coding unit 105, and a high image quality data storage unit 106.

The camera unit 101 including, for example, a CCD camera, is mounted in a vehicle. The camera unit 101 photographs moving images of surroundings of the own vehicle (mostly images in a direction where the vehicle is heading) when the vehicle is travelling. The normal image quality coding unit 102 compresses the moving image data obtained by the camera unit 101 with normal image quality. Hereinafter, the moving image data compressed with normal image quality by the normal image quality coding unit 102 is called normal-quality compressed moving image data. More specifically describing the normal image quality in this specification, for example, codec is Motion-JPEG, angle of view is 640×480, and frame rate is 15 fps. The normal image quality coding unit 102 can be configured by a MPU and a memory. The processing steps of the normal image quality coding unit 102 are conventionally executed by software, and the software is stored in a recording medium such as ROM. The processing steps may be executed by hardware (dedicated circuit).

The normal image quality data storage unit 103 records therein the normal-quality compressed moving image data outputted from the normal image quality coding unit 102. The normal image quality data storage unit 103 can record the moving image data over an extensive period of time as compared to the high image quality data storage unit 106. The normal image quality data storage unit 103 continues to record the normal-quality compressed moving image data, and deletes the oldest data already written therein by overwriting when its storage capacity is full.

The trigger detecting unit 104 is provided to detect some kind of abnormal condition which possibly happens when the own vehicle is travelling. When the abnormal condition is detected, the trigger detecting unit 104 sends a high image quality recording start trigger to the high image quality coding unit 105. Examples of the abnormal condition are; another vehicle in too proximity quite possibly colliding with the own vehicle, walking person in too proximity, sudden braking, and physical impact on the own vehicle. The trigger detecting unit 104 includes any of image processing apparatuses such as supersonic sensor, visible light sensor, far-infrared camera, millimeter wave sensor, laser radar apparatus, acceleration sensor, magnetic sensor, infrared sensor, brake sensor, or camera, or any of different combinations of these apparatuses. The trigger detecting unit 104 is provided in the vehicle to detect any of the abnormal conditions which possibly happens in the own vehicle. The trigger detecting unit 104, for example, detects another vehicle in too proximity using the magnetic sensor, walking person in too proximity using the infrared sensor, sudden braking using the brake sensor by measuring a foot pressure applied to a brake, and physical impact using the acceleration sensor.

Figure 1B:
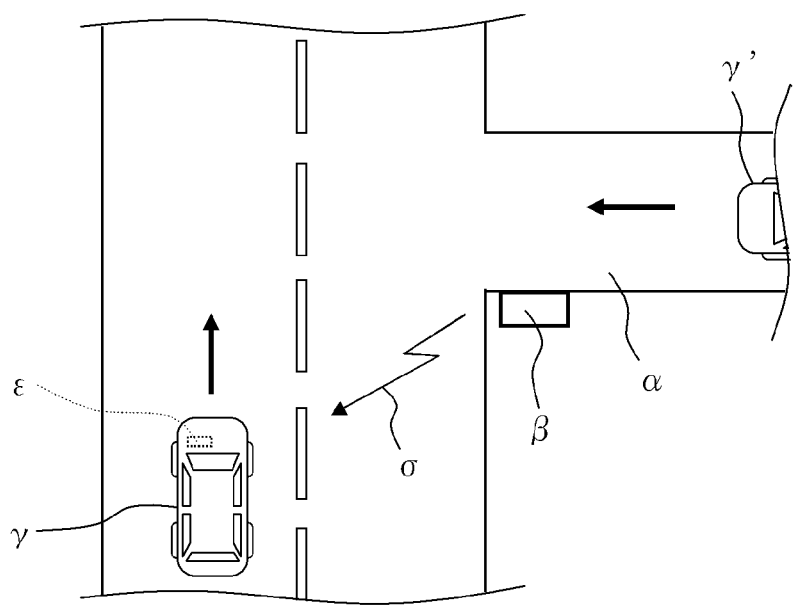
FIG. 1B is a drawing illustrating a modified embodiment of the exemplary embodiment 1.

As illustrated in FIG. 1B, the trigger detecting unit 104 may include a road-side sensor β provided on a road end α, and a reception apparatus ε provided in an own vehicle γ. A vehicle proximity detecting sensor constitutes the road-side sensor β.

When the road-side sensor β senses another vehicle γ' in too proximity, the road-side sensor β wirelessly transmits a proximate object detection signal (wireless signal) σ. When the reception apparatus ε receives the proximate object detection signal σ, the reception apparatus ε generates the high image quality recording start trigger and supplies it to the high image quality coding unit 105. The road-side sensor β is set on the road end α, which is, for example, an intersection where traffic accidents often occurs or a S-curve mountain road with bad visibility (end of three-forked road with bad visibility in FIG. 1B), and the reception apparatus ε is set in the own vehicle γ. When the own vehicle γ' arrives at the road end α and the road-side sensor β then senses the another vehicle γ' in too proximity of the road-side sensor β, the road-side sensor β transmits the proximate object detection signal σ. When the reception apparatus ε receives the proximate object detection signal σ, the reception apparatus ε transmits the high image quality recording start trigger to the high image quality coding unit 105.

The trigger detecting unit 104 thus technically characterized can detect the another vehicle γ' in too proximity (vehicle entering an intersection or oncoming vehicle), which cannot be detected by the sensor of the own vehicle γ alone, by way of the road-side sensor β. Thus, the abnormal condition, which may be overlooked by the trigger detecting unit 104 of the own vehicle γ, can be successfully detected. This improves accuracy in catching the abnormal condition which demands the moving image data recorded with high image quality in the in-vehicle moving image data recording apparatus 1. It is not necessarily the another vehicle γ which is detected by the road-side sensor β, and the road-side sensor β may be configured to detect a motor bike or human body. At an intersection where traffic accidents often occurs or on S-curve mountain road with bad visibility, a road-side sensor β' including a signal transmitter which constantly transmits a wireless signal notifying a danger zone (hereinafter, called danger zone notification signal σ') may be provided in place of the road-side sensor β. The reception apparatus ε then simply receives the danger zone notification signal σ constantly transmitted from the road-side sensor β' without confirming whether the another vehicle γ is too proximate, and outputs the high image quality recording start trigger to the high image quality coding unit 105. The own vehicle γ already provided with the trigger detecting unit 104 including the various sensors may be further provided with a trigger detecting unit 104' having the road-side sensor β and the reception apparatus ε, wherein the abnormal conditions can be further accurately detected.

The structural characteristic of the in-vehicle moving image data recording apparatus 1A illustrated in FIG. 1A is described again. The high image quality coding unit 105 compresses the moving image data obtained by the camera unit 101 with high image quality. More specifically describing the high image quality, for example, codec is Motion-JPEG2000, field of angle is 1440×1080, and frame rate is 30 fps. The high image quality coding unit 105 is conventionally configured by, for example, a MPU and a memory. A software program stored in a recording medium such as ROM is conventionally used for processing steps carried out by the high image quality coding unit 105, however, the processing steps may be executed by hardware (dedicated circuit) may be used.

When the high image quality recording start trigger is transmitted from the trigger detecting unit 104 to the high image quality cording unit 105, the high image quality data storage unit 106 keeps all of the high-quality compressed moving image data outputted from the high image quality coding unit 105 at and after a time point when the trigger is received. The high image quality data storage unit 106 records therein all of the high-quality compressed moving image data from a time point earlier by a given period of time than the trigger reception time point onwards. To thus set the timing of starting the high image quality recording, the high image quality data storage unit 106 discards the old high-quality compressed moving image data by overwriting the old data with the latest high-quality compressed moving image data so that the constantly updated high-quality compressed moving image data is recorded. When the recording start trigger is received while the high-quality compressed moving image data is constantly updated and recorded, the high image quality data storage unit 106 keeps all of the high-quality compressed moving image data from the recording start time point earlier by the given period of time than the trigger reception time point until a recording end time point later by a given period of time than the recording start time point. Accordingly, the high image quality data storage unit 106 can constantly store all of the high-quality compressed moving image data from the time point earlier by the given period of time than the trigger output timing onwards regardless of when the high image quality start trigger is outputted. The recording starts earlier than the trigger output timing by, for example, 15 seconds (the given period of time).

To thus set the timing of starting the high image quality recording, the high image quality coding unit 105 can constantly generate and supply the high-quality compressed moving image data to the high image quality data storage unit 106. The high image quality data storage unit 106 can overwrite the high-quality compressed moving image data at an initial position of its own storage capacity with the latest high-quality compressed moving image data inputted beyond the storage capacity. The high image quality data storage unit 106 is also able to store therein all of the high-quality compressed moving image data from the time point earlier by the given period of time than the timing of detecting the abnormal condition (timing of outputting the high image quality recording start trigger) onwards.

Figure 2:
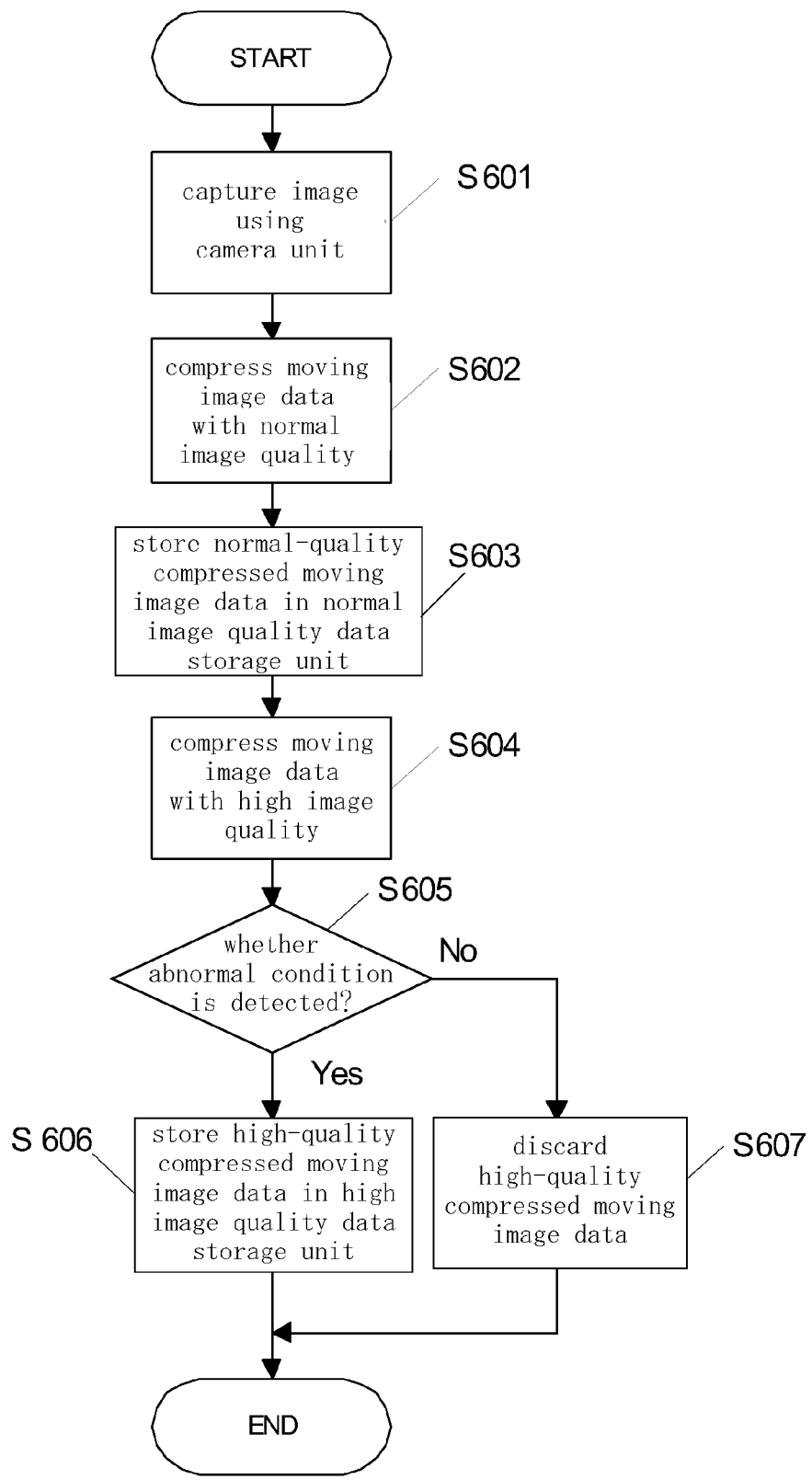
FIG. 2 is a flow chart illustrating an operation of the in-vehicle moving image data recording apparatus according to the exemplary embodiment 1.

Next, the operation of the in-vehicle moving image data recording apparatus 1A is described referring to a flow chart illustrated in FIG. 2. First, the camera unit 101 provided in the own vehicle photographs the circumstances around the travelling vehicle (S601). Then, the normal image quality coding unit 102 compresses the moving image data obtained by the camera unit 101 with normal image quality (Step S602). The normal image quality data storage unit 103 stores therein the normal-quality compressed moving image data outputted from the normal image quality coding unit 102 (Step S603).

The moving image data outputted from the camera unit 101 is compressed by the high image quality coding unit 105 to meet the following requirements (high image quality requirements) as compared to the normal image quality (Step S604):
high image quality codec
high bit rate
high frame rate
better image quality on a large display screen The high-quality compressed moving image data outputted from the high image quality coding unit 105 is constantly recorded in the high image data storage unit 106. Every time when the capacity of the storage unit 106 is full, the oldest data then is discarded.

Next, it is determined whether the abnormal condition (for example, another vehicle in too proximity quite possibly colliding with the own vehicle, walking person in too proximity, sudden braking, or physical impact on the own vehicle) is detected by the trigger detecting unit 104 (Step S605). Step S605 can be determined by confirming whether the high image quality recording start trigger notifying the detected abnormal condition is outputted from the trigger detecting unit 104 to the high image quality coding unit 105. When it is confirmed that the abnormal condition is detected (when the output of the high image quality recording start trigger is confirmed), the high image quality data storage unit 106 keeps all of the high-quality compressed moving image data earlier and later by a given period of time on time axis than a time point when the trigger is confirmed (Step S606). After a given period of time passed while failing to confirm the high image quality recording start trigger, the high image quality data storage unit 106 does not store but discards the high-quality compressed moving image data (Step S607). In Step S606, the storage of the high-quality compressed moving image data starts at the time point earlier by the given period of time than the timing of detecting the high image quality recording start trigger as described earlier.

FIG. 3 is a conceptual rendering of the storage and deletion of the normal image quality data and the high image quality data. As described earlier, the normal-quality compressed moving image data is outputted from the normal image quality coding unit 102, and the high-quality compressed moving image data is outputted from the high image quality coding unit 105. As long as the vehicle is travelling in normal condition, the normal-quality compressed moving image data alone is stored in the normal image quality data storage unit 103, whereas the high-quality compressed moving image data is not retained in the high image quality data storage unit 106 but is discarded one after another. When the high image quality recording start trigger is inputted to the high image quality data storage unit 106, the high image quality data storage unit 106 suspends the data deletion to store therein the high-quality compressed moving image data, the recording of which starts at the time point earlier by the given period of time than the trigger reception time point. In a given period of time after the high image quality recording start trigger is inputted to the high image quality data storage unit 106, the high image quality data storage unit 106 stops recording the high-quality compressed moving image data and restarts to discard the data. The high image quality data storage unit 106 may stop recording the high-quality compressed moving image data and restart to discard the data as soon as the acceleration sensor detects that the vehicle is travelling in normal condition again after the recording of the high-quality compressed moving image data starts.

As described so far, according to the exemplary embodiment 1, the moving image data is recorded with normal image quality when the vehicle is running in normal condition so that the storage memory is effectively used, and the high-quality compressed moving image data can be obtained immediately before and after an accident occurs. To record the high-quality compressed moving image data, the compression codec, bit rate, and angle of view are changed as well as the frame rate and GOP structure, so that the high-quality moving image data of the vehicle surroundings immediately before and after an accident occurs can be obtained. In the case where the apparatus is equipped with the trigger detecting unit 104' including the road-side sensor β and the reception apparatus ε as well as the trigger detecting unit 104 including various sensors mounted in the own vehicle, the high-quality moving image data in the vehicle surroundings when the abnormal condition occurs is not overlooked but is successfully obtained.

Exemplary Embodiment 2

In an exemplary embodiment 2 of the present invention, an in-vehicle moving image data recording apparatus 1B equipped with the following functions is described:

moving image data supplied from a plurality of camera units mounted in front, back, and two side sections of a vehicle are subject to two different compression processes which are normal image quality compression and high image quality compression; and when the abnormal condition is detected, storage units store therein all of the high-quality compressed moving image data from a time point earlier by a given period of time than a time point when the abnormal condition is detected onwards.

Figure 4:
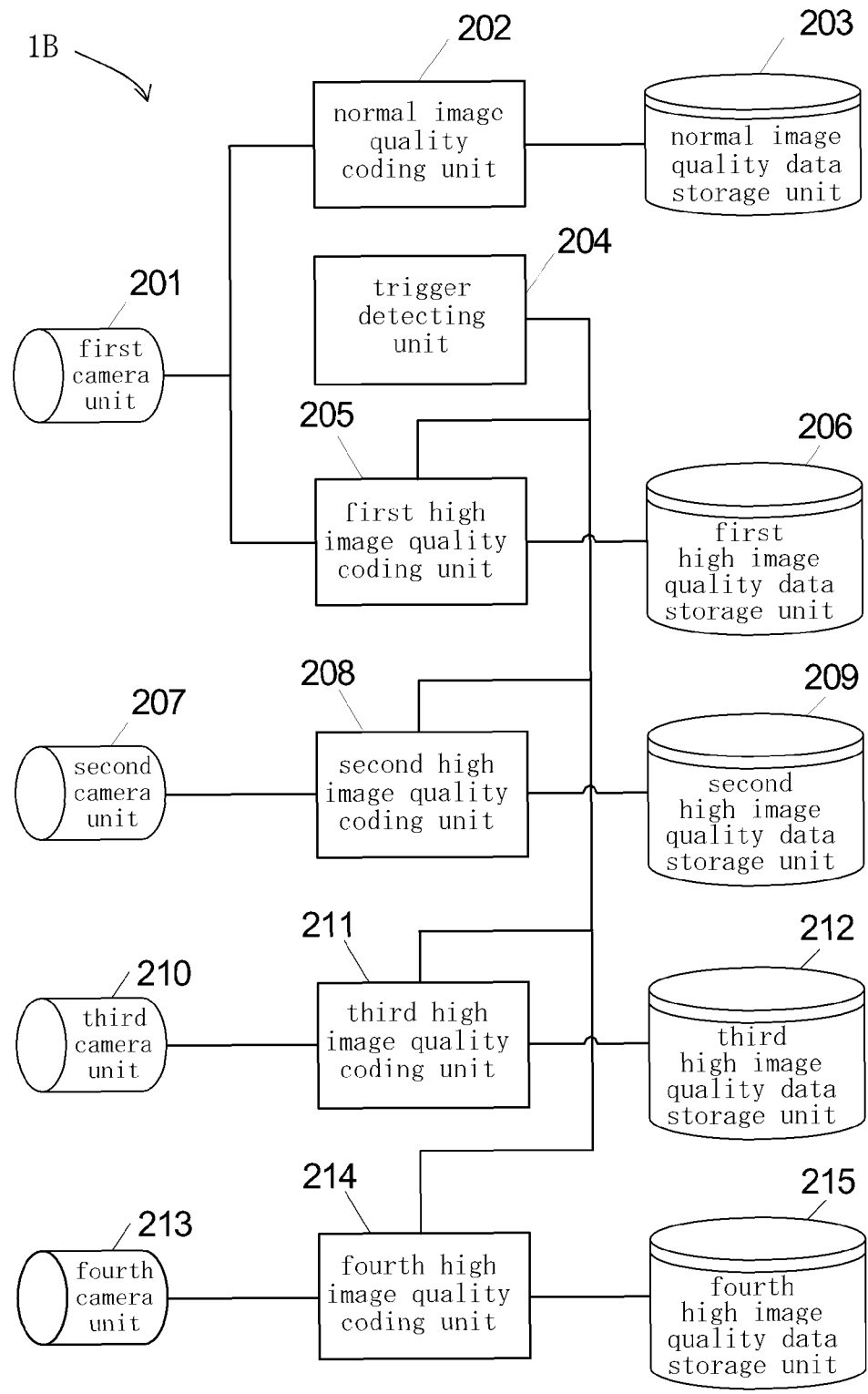
FIG. 4 is a block diagram illustrating a structure of an in-vehicle moving image data recording apparatus according to an exemplary embodiment 2 of the present invention.

FIG. 4 is a block diagram illustrating a structure of the in-vehicle moving image data recording apparatus 1B. The present exemplary embodiment describes the apparatus referring to a structure having four camera units in front, back and two side sections of the vehicle, however, less or more than four camera units may be provided.

The in-vehicle moving image data recording apparatus 1B is provided with a first camera unit 201, a normal image quality coding unit 202, a normal image quality data storage unit 203, a trigger detecting unit 204, a first high image quality coding unit 205, a first high image quality data storage unit 206, a second camera unit 207, a second high image quality coding unit 208, a second high image quality data storage unit 209, a third camera unit 210, a third high image quality coding unit 211, a third high image quality data storage unit 212, a fourth camera unit 213, a fourth high image quality coding unit 214, and a fourth high image quality data storage unit 215.

The first camera unit 210 is provided to photograph images in a direction where the vehicle is heading and mounted in a front section of the vehicle. The first camera unit 201 is structurally similar to the camera unit 101 according to the exemplary embodiment 1 described earlier.

The normal image quality coding unit 202 compresses first moving image data obtained by the first camera unit 201 with normal image quality. The normal image quality coding unit 202 is structurally similar to the normal image quality coding unit 102 according to the exemplary embodiment 1 described earlier. The normal image quality data storage unit 203 is provided to store therein the normal-quality compressed moving image data outputted from the normal image quality coding unit 202. The normal image quality data storage unit 203 is structurally similar to the normal image data storage unit 103 according to the exemplary embodiment 1 described earlier. The trigger detecting unit 204 detects the abnormal condition which possibly occurs when the vehicle is travelling. The trigger detecting unit 204 is structurally similar to the trigger detecting unit 104 according to the exemplary embodiment 1 described earlier.

The first high image quality coding unit 205 compresses the first moving image data obtained by the first camera unit 201 with high image quality. The first high image quality coding unit 205 is structurally similar to the high image quality coding unit 105 according to the exemplary embodiment 1 described earlier.

The first high image quality data storage unit 206 records the first high-quality compressed moving image data outputted from the first high image quality coding unit 205 based on a timing by which a high image quality recording start trigger is outputted from the trigger detecting unit 204. The first high image quality data storage unit 206 is structurally similar to the high image quality data storage unit 106 according to the exemplary embodiment 1 described earlier.

The second camera unit 207, third camera unit 210, and fourth camera unit 213 are respectively mounted in back and two side sections of the vehicle to photograph images in the surroundings of the running vehicle.

The second high image quality coding unit 208, third high image quality coding unit 211, and fourth high image quality coding unit 214 respectively compress second-fourth moving image data obtained by the second camera unit 207, third camera unit 210, and fourth camera unit 213 with high image quality. These high image quality coding units are structurally similar to the first high image quality coding unit 205.

The second high quality image data storage unit 209, third high quality image data storage unit 212, and fourth high quality image data storage unit 215 respectively records the first-fourth high-quality compressed moving image data outputted from the second high image quality coding unit 208, third high image quality coding unit 211, and fourth high image quality coding unit 214 based on the timing by which the high image quality recording start trigger is outputted from the trigger detecting unit 204. These high quality image data storage units are structurally similar to the first high quality image data storage unit 206.

Figure 5:
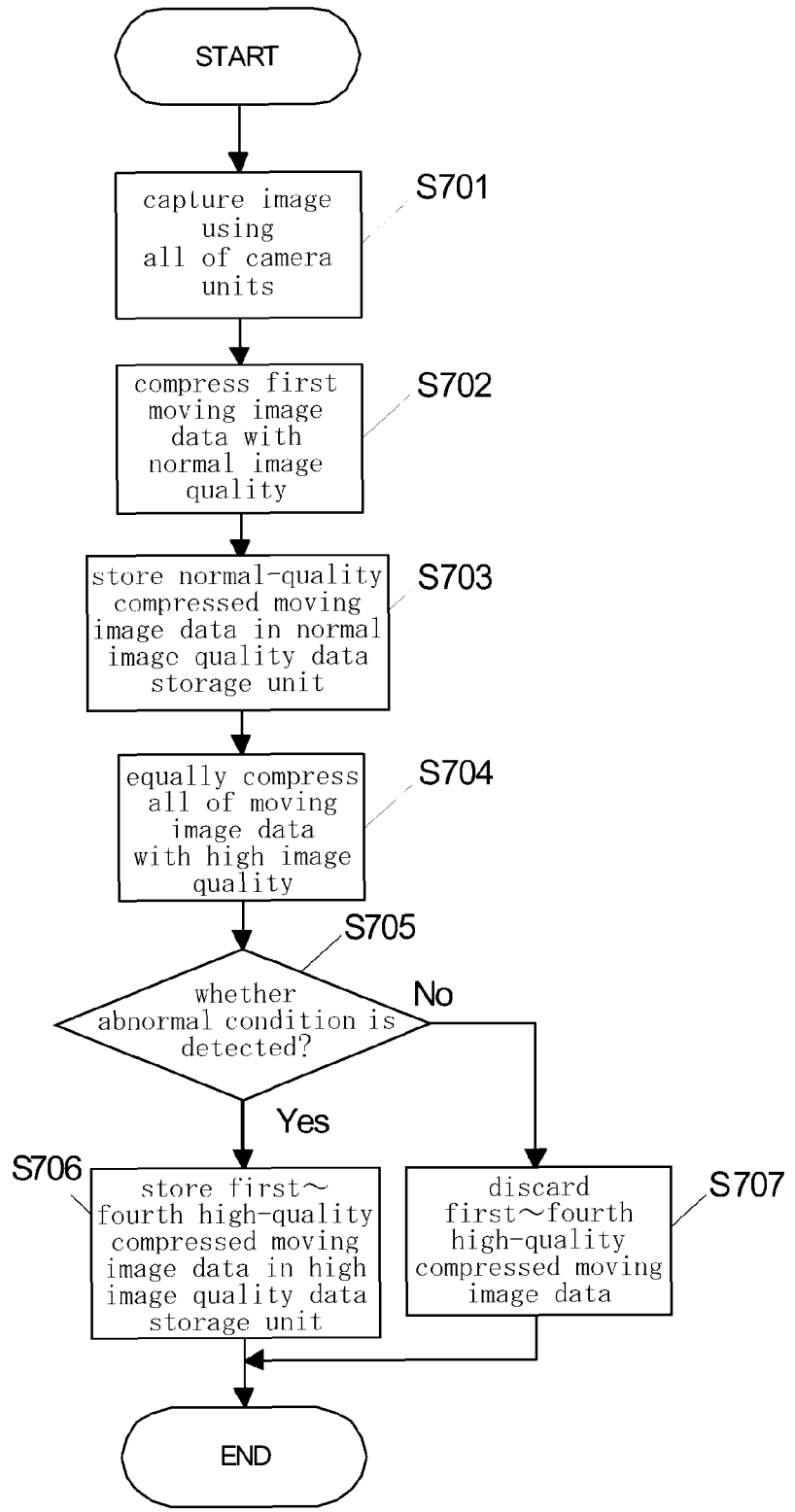
FIG. 5 is a flow chart illustrating an operation of the in-vehicle moving image data recording apparatus according to the exemplary embodiment 2.

Next, the operation of the in-vehicle moving image data recording apparatus 1B is described referring to a flow chart illustrated in FIG. 5. First, the first-fourth camera units 201, 207, 210, and 213 mounted in the front, back and two side sections of the vehicle photograph the circumstances around the running own vehicle (Step S701). Next, the normal image quality coding unit 202 compresses the first moving image data obtained by the first camera unit 201 mounted in the front section of the vehicle with normal image quality (Step S702). Then, the normal image quality data storage unit 203 stores therein the normal-quality compressed moving image data outputted from the normal image quality coding unit 202 (Step S703). The first-fourth moving image data outputted from the first-fourth camera units 201, 207, 210, and 213 are compressed by the first-fourth high image quality coding units 205, 208, 211, and 214 to meet the following requirements as compared to the normal image quality (Step S704):

high image quality codec;

high bit rate;

high frame rate; and better image quality on a large display screen

The first-fourth high-quality compressed moving image data outputted from the first-fourth high image quality coding units 205, 208, 211, and 214 are constantly recorded in the first-fourth high image quality data storage units 206, 209, 212, and 215. Every time when any of the capacities of the storage units 206, 209, 212, and 215 is full, the oldest data then is discarded.

It is determined whether the abnormal condition (for example, another vehicle in too proximity quite possibly colliding with the own vehicle, walking person in too proximity, sudden braking, or physical impact on the own vehicle) is detected by the trigger detecting unit 204 (Step S705). Step S705 can be determined by confirming whether the high image quality recording start trigger notifying the detected abnormal condition is outputted from the trigger detecting unit 204 to the first-fourth high image quality coding units 205, 208, 211, and 214. When it is confirmed that the abnormal condition is detected (when the output of the high image quality recording start trigger is confirmed), the first-fourth high image quality data storage units 206, 209, 212, and 215 keep all of the high-quality compressed moving image data earlier and later by a given period of time on time axis than a time point when the trigger is confirmed (Step S706). After a given period of time passed while failing to confirm the high image quality recording start trigger, the first-fourth high image quality data storage units 206, 209, 212, and 215 do not store but discard the first-fourth high-quality compressed moving image data (Step S707). In Step S706, the storage of the first-fourth high-quality compressed moving image data starts at the time point earlier by the given period of time than the timing of detecting the high image quality recording start trigger as described earlier.

As described so far, according to the present exemplary embodiment wherein the plurality of camera units are used to record the peripheral circumstances of the vehicle, the vehicle surroundings immediately before and after the occurrence of an accident can be photographed in all directions, and the high-quality compressed moving image data obtained therefrom can be recorded. The high-quality compressed moving image data thus reflecting the detailed information can help to analyze what caused the accident. When the vehicle is travelling in normal condition, the normal-quality compressed moving image data is recorded to fully utilize the storage capacities of the storage units. The present exemplary embodiment is further advantageous in that the compression codec, bit rate, and angle of view are changed as well as the frame rate and GOP structure to record the high-quality compressed moving image data, so that the image quality of the moving image data can be further improved. In the case where the apparatus is equipped with the trigger detecting unit 104' including the road-side sensor β and the reception apparatus ε as well as the trigger detecting unit 104 including various sensors mounted in the vehicle, the high-quality moving image data in the vehicle surroundings when the abnormal condition occurs is not overlooked but is successfully obtained.

In the structure according to the present exemplary embodiment, four camera units are provided in the front, back and two side sections of the vehicle, however, the number of the camera units and where they should be located are not necessarily limited to the given examples.

According to the present exemplary embodiment, all of the first-fourth moving image data outputted from the first-fourth camera units 201, 207, 210, and 213 are recorded with high image quality based on the timing by which the high image quality recording start trigger is outputted from the trigger detecting unit 204. Alternatively, the moving image data outputted from one of the first-fourth camera units 201, 207, 210, and 213 nearest to a site of occurrence of the abnormal condition which initiated the output of the high image quality recording start trigger may be selectively recorded with high image quality. For example, when the trigger detecting unit 204 detects another vehicle or walking person in too proximity, or detects abnormal impacts from different directions and determines the own vehicle received the heaviest impact from the front direction, the moving image data outputted from the first camera unit 201 which photographs the front direction of the vehicle may be selectively recorded with high image quality in the first high image quality data storage unit 206. To allow such a selective high image quality recording, the trigger detecting unit 204 should be able to determine in which direction the abnormal condition took place. Specific examples are; to provide the trigger detecting unit 204 capable of sensing directivity in each of the four directions to detect the abnormal condition which happened to the own vehicle from four directions (front, back and two side secions), and to provide the trigger detecting unit 204 capable of identifying and detecting in which direction the abnormal condition took place.

Exemplary Embodiment 3

An exemplary embodiment 3 of the present invention describes an in-vehicle moving image data recording apparatus 1C which, in addition to the technical advantages of the exemplary embodiment 1, selectively records a number plate image region in moving image data outputted from a camera unit with high image quality when a number plate of another vehicle is detected in the moving image data.

Figure 6:
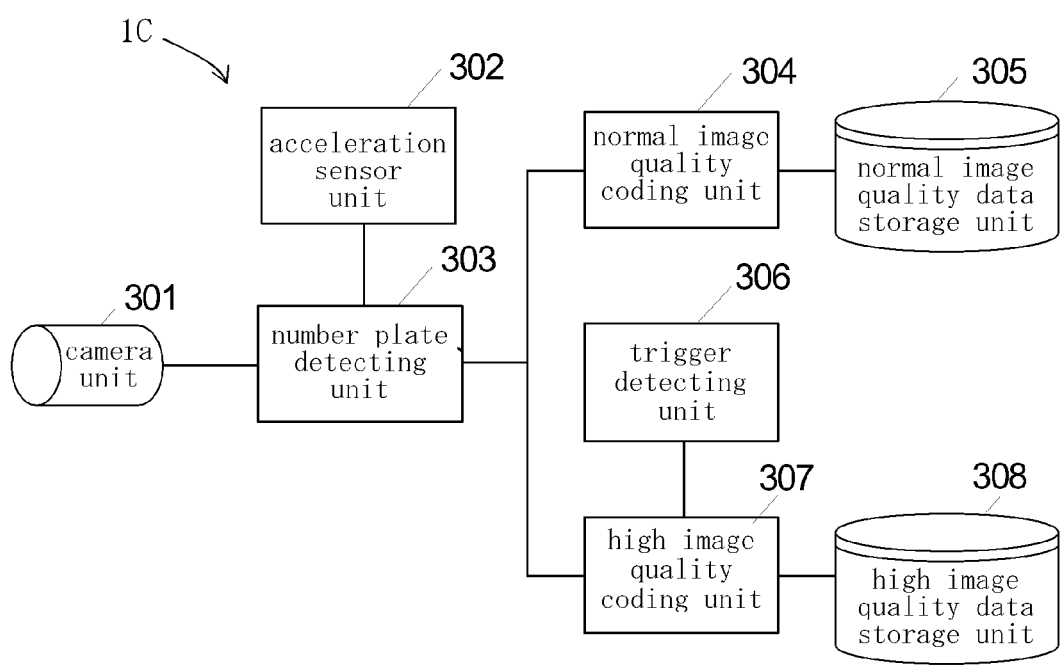
FIG. 6 is a block diagram illustrating a structure of an in-vehicle moving image data recording apparatus according to an exemplary embodiment 3 of the present invention.

FIG. 6 is a block diagram illustrating a structure of the in-vehicle moving image data recording apparatus 1C. The in-vehicle moving image data recording apparatus 1C is equipped with a camera unit 301, an acceleration sensor unit 302, a number plate detecting unit 303, a normal image quality coding unit 304, a normal image quality data storage unit 305, a trigger detecting unit 306, a high image quality coding unit 307, and a high image quality data storage unit 308. The camera unit 301 is mounted in the own vehicle. The camera unit 301 is provided to photograph the surroundings of the travelling own vehicle, and structurally similar to the camera unit 101 according to the exemplar embodiment 1 described earlier. The acceleration sensor unit 302 senses an acceleration of the own vehicle from its travelling condition. The number plate detecting unit 303 detects a number plate of another vehicle in the moving image data obtained by the camera unit 301. The number plate detecting unit 303 detects the number plate of another vehicle through motion prediction of the number plate using the information of the acceleration sensor unit 302. More specifically, the number plate detecting unit 303 detects an image region including a four-digit number estimated as the number plate of another vehicle (hereinafter, called number plate image region) in the moving image data obtained by the camera unit 301. To detect the image region, the number plate detecting unit 303 takes into account that the number plate image region in a current moving image frame changed its position by a rate of change in accordance with the acceleration sensed by the acceleration sensor unit 302 as compared to the number plate image region in a moving image frame immediately before the current moving image frame to more accurately detect the number plate image region.

The normal image quality coding unit 304 compresses the moving image data obtained by the camera unit 301 with normal image quality, and is structurally similar to the normal image quality coding unit 102 according to the exemplar embodiment 1 described earlier. The normal image quality data storage unit 305 records therein the normal-quality compressed moving image data outputted from the normal image quality coding unit 304, and is structurally similar to the normal image quality data storage unit 103 according to the exemplar embodiment 1 described earlier. The trigger detecting unit 306 detects the abnormal condition (for example, another vehicle in too proximity quite possibly colliding with the own vehicle, walking person in too proximity, sudden braking, or physical impact on the own vehicle) which possibly happens to the travelling own vehicle. Upon detection of the abnormal condition, the trigger detecting unit 306 transmits a high image quality recording start trigger to the high image quality coding unit 307. Thus, the trigger detecting unit 306 is structurally similar to the trigger detecting unit 104 according to the exemplar embodiment 1 described earlier.

When the number plate is detected by the number plate detecting unit 303, the high image quality coding unit 307 selectively compresses the number plate image region in the moving image data obtained by the camera unit 301 with high image quality. In the case where the number plate image region is not detected, the high image quality coding unit 307 compresses the whole moving image data with high image quality. To compress the number plate image region with high image quality, the high image quality coding unit 307 may use, for example, ROI (Region of Interest) of JPEG2000. Other than selectively compressing the number plate image region with high image quality, the high image quality coding unit 307 is structurally similar to the high image quality coding unit 105 according to the exemplar embodiment 1 described earlier.

The high image quality data storage unit 308 records therein the high-quality compressed moving image data outputted from the high image quality coding unit 307 based on a timing by which the trigger detecting unit 306 outputs the high image quality recording start trigger. The high image quality data storage unit 308 is structurally similar to the high image quality data storage unit 106 according to the exemplar embodiment 1 described earlier.

The operation of the in-vehicle moving image data recording apparatus is described referring to a flow chart illustrated in FIG. 7. The camera unit 301 mounted in the own vehicle photographs the surroundings of the running own vehicle (Step S801). In parallel with the processing step of S801, the acceleration sensor unit 302 acquires the acceleration of the running own vehicle (Step S802). After these processing steps, the number plate detecting unit 303 detects the number plate image region in the moving image data obtained by the camera unit 301 based on the acceleration obtained by the acceleration sensor unit 302 (Step S803).

Then, the moving image data obtained by the camera unit 301 is compressed with normal image quality (Step S804), and the normal-quality compressed moving image data generated in Step S804 is stored in the normal image quality data storage unit 305 (Step S805).

While these processing steps are carried out, the number plate detecting unit 303 determines whether the moving image data includes the number plate image region (Step S806). When it is determined in Step S806 that the number plate image region is included, the number plate detecting unit 303 extracts the number plate image region from the moving image data. The high image quality coding unit 307 selectively compresses the extracted number plate image region with high image quality (Step S807). Hereinafter, the image data of the number plate image region compressed with high image quality is called high-quality compressed number plate image region. When it is determined in Step S806 that the number plate image region is not included, the high image quality coding unit 307 equally compresses all of the regions in the moving image data with high image quality (Step S808).

Next, it is determined whether the abnormal condition (for example, another vehicle in too proximity quite possibly colliding with the own vehicle, walking person in too proximity, sudden braking, or physical impact on the own vehicle) is detected by the trigger detecting unit 306 (Step S809). Step S809 can be determined by confirming whether the high image quality recording start trigger notifying the detected abnormal condition is outputted from the trigger detecting unit 306 to the high image quality coding unit 307. When the detection of the abnormal condition is confirmed (when the output of the high image quality recording start trigger is confirmed), the high image quality data storage unit 308 keeps all of the high-quality compressed number plate image regions earlier and later by a given period of time on time axis than a time point when the trigger is detected (Step S810). After a given period of time passed while failing to confirm the high image quality recording start trigger, the high image quality data storage unit 308 does not store but discards the high-quality compressed number plate image regions (Step S811). In Step S810, the storage of the high-quality compressed number plate image region starts at the time point earlier by the given period of time than the timing by which the high image quality recording start trigger is detected as described earlier.

As described so far, according to the present exemplary embodiment, the moving image data is recorded with normal image quality when the vehicle is running in normal condition so that the storage memory is effectively used, and the high-quality compressed moving image data can be obtained immediately before and after an accident occurs. Further, the compression codec, bit rate, and angle of view are changed as well as the frame rate and GOP structure, so that the high-quality moving image data of the vehicle surroundings immediately before and after an accident occurs can be obtained.

When the number plate image region is thus compressed with high image quality, useful information can be obtained to, for example, identify any car involved in an accident (from the number plate), and identify an eye witness of the accident (who is the driver of the car with the identified number plate).

In the case where the apparatus is equipped a trigger detecting unit 307' including the road-side sensor β and the reception apparatus ε as well as the trigger detecting unit 307 including various sensors mounted in the own vehicle, the high-quality moving image data of the vehicle surroundings when the abnormal condition occurs is not overlooked but is successfully obtained.

According to the present exemplary embodiment, the number plate image region is selectively compressed with high image quality. The image region selectively extracted and compressed with high image quality may include information other than the number plate, for example, traffic signal, road sign, motor bike, bicycle, or walking person. In that case, the number plate detecting unit 303 detects the image region including the target to be extracted (traffic signal, road sign, motor bike, bicycle, or walking person).

Exemplary Embodiment 4

An exemplary embodiment 4 of the present invention describes an in-vehicle moving image data recording apparatus 1D technically characterized as follows:

moving image data supplied from a plurality of camera units provided in front, back, and two side sections of a vehicle are subject to two different compression processes which are normal image quality compression and high image quality compression;

when the abnormal condition is detected, storage units store therein all of the high-quality compressed moving image data from a time point earlier by a given period of time than a time point when the abnormal condition is detected onwards; and a driver of the vehicle is forewarned of any predicted danger when the vehicle is travelling.

Figure 8:
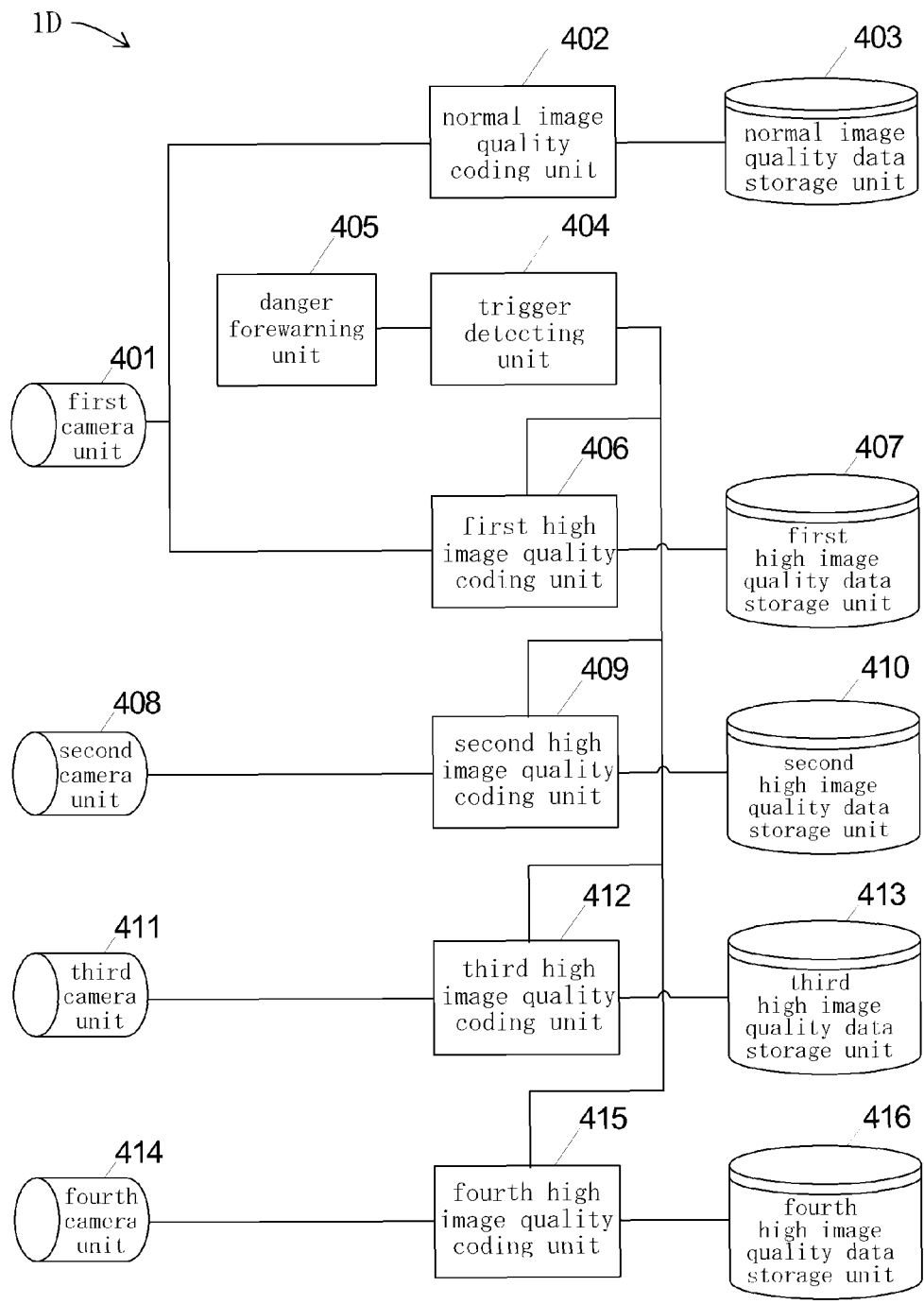
FIG. 8 is a block diagram illustrating a structure of an in-vehicle moving image data recording apparatus according to an exemplary embodiment 4 of the present invention.

FIG. 8 is a block diagram illustrating a structure of the in-vehicle moving image data recording apparatus 1D. According to the present exemplary embodiment, four camera units, for example, are mounted in the front, back and two side sections of the own vehicle. The in-vehicle moving image data recording apparatus 1D has a first camera unit 401, a normal image quality coding unit 402, a normal image quality data storage unit 403, a trigger detecting unit 404, a danger forewarning unit 405, a first high image quality coding unit 406, a first high image quality data storage unit 407, a second camera unit 408, a second high image quality coding unit 409, a second high image quality data storage unit 410, a third camera unit 411, a third high image quality coding unit 412, a third high image quality data storage unit 413, a fourth camera unit 414, a fourth high image quality coding unit 415, and a fourth high image quality data storage unit 416.

The first camera unit 401, normal image quality coding unit 402, and normal image quality data storage unit 403 are structurally similar to the first camera unit 201, normal image quality coding unit 202, and normal image quality data storage unit 203 according to the exemplary embodiment 2 described earlier.

The first high image quality coding unit 406 compresses first moving image data obtained by the first camera unit 401 with high image quality. The first high image quality data storage unit 407 records therein the first high-quality compressed moving image data outputted from the first high image quality coding unit 406 based on a timing by which a high image quality recording start trigger is outputted from the trigger detecting unit 404. The first high image quality coding unit 406 and the first high image quality data storage unit 407 are structurally similar to the first high image quality coding unit 205 and the first high image quality data storage unit 206 according to the exemplary embodiment 2 described earlier.

The second high image quality coding unit 409 compresses second moving image data obtained by the second camera unit 408 with high image quality. The second high image quality data storage unit 410 records therein the second high-quality compressed moving image data outputted from the second high image quality coding unit 409 based on the timing by which the high image quality recording start trigger is outputted from the trigger detecting unit 404. The second camera unit 408, second high image quality coding unit 409, and second high image quality data storage unit 410 are structurally similar to the second camera unit 207, second high image quality coding unit 208, and second high image quality data storage unit 209 according to the exemplary embodiment 2 described earlier.

The third high image quality coding unit 412 compresses third moving image data obtained by the third camera unit 411 with high image quality. The third high image quality data storage unit 413 records therein the third high-quality compressed moving image data outputted from the third high image quality coding unit 412 based on the timing by which the high image quality recording start trigger is outputted from the trigger detecting unit 404. The third camera unit 411, third high image quality coding unit 412, and third high image quality data storage unit 413 are structurally similar to the third camera unit 210, third high image quality coding unit 211, and third high image quality data storage unit 212 according to the exemplary embodiment 2 described earlier.

The fourth high image quality coding unit 415 compresses fourth moving image data obtained by the fourth camera unit 414 with high image quality. The fourth high image quality data storage unit 416 records therein the fourth high-quality compressed moving image data outputted from the fourth high image quality coding unit 415 are structurally similar. The fourth camera unit 414, fourth high image quality coding unit 415, and fourth high image quality data storage unit 416 are structurally similar to the fourth camera unit 213, fourth high image quality coding unit 214, and fourth high image quality data storage unit 215 according to the exemplary embodiment 2 described earlier.

Though the trigger detecting unit 404 is basically structurally similar to the trigger detecting unit 204 according to the exemplary embodiment 2 described earlier, the trigger detecting unit 404 according to the present exemplary embodiment detects the abnormal condition in two different levels; attention-seeking level, and accident-certainty level. The accident-certainty level is similar to the detection of the abnormal condition by the trigger detecting unit 204 according to the exemplary embodiment 2. The attention-seeking level is not as certain as the accident-certainty level but is very likely to develop to the accident-certainty level as far as the current situation goes on, making it necessary to call for the driver's attention. Hereinafter, the abnormal condition of the attention-seeking level is called abnormal condition (attention-seeking), and the abnormal condition of the accident-certainty level is called abnormal condition (accident-certainty).

The abnormal condition (attention-seeking) is, for example, another vehicle or a walking person has approached the own vehicle with a given distance or less therefrom, and it is very likely that the another vehicle collides with the vehicle or the walking person is hit by the vehicle if they continue to further approach the own vehicle (abnormal condition (accident-certainty). When the trigger detecting unit 404 detects the abnormal condition (attention-seeking), the danger forewarning unit 405 forewarns the own vehicle driver of the abnormal condition (attention-seeking). The danger forewarning unit 405 makes a warning sound or display a warning on a display screen to let the driver be forewarned. The danger forewarning unit 405 may give similar warnings to the approaching another vehicle or walking person.

The operation of the in-vehicle moving image data recording apparatus 1D is described referring to a flow chart illustrated in FIG. 9. The first-fourth camera units 401, 408, 411, and 414 mounted in the front, back and two side sections of the vehicle photograph the surroundings of the travelling own vehicle (Step S901). The normal image quality coding unit 402 compresses the first moving image data obtained by the first camera unit 401 mounted in the front section of the vehicle with normal image quality (Step S902). The normal image quality data storage unit 403 stores therein the normal-quality compressed moving image data outputted from the normal image quality coding unit 402 (Step S903). The first-fourth moving image data obtained by the first-fourth camera units 401, 408, 411, and 414 are respectively compressed by the first-fourth high image quality coding units 406, 409, 412, and 415 to meet the following requirements as compared to the normal image quality (high image quality requirements) (Step S904):

high image quality codec;
high bit rate;
high frame rate; and
better image quality on a large display screen Then, it is determined whether the abnormal condition (attention-seeking) is detected by the trigger detecting unit 404 (Step S905). Step S905 does not determine whether the abnormal condition (accident-certainty) is detected but determines whether the trigger detecting unit 404 detects the abnormal condition (attention-seeking) very likely to develop into the abnormal condition (accident-certainty) if the current situation continues. Step S905 is determined by confirming whether a warning start trigger notifying the detected abnormal condition (attention-seeking) is outputted from the trigger detecting unit 104 to the danger forewarning unit 405. When the detection of the abnormal condition (attention-seeking) is confirmed (when the output of the warning start trigger is confirmed), the danger forewarning unit 405 forewarns the own vehicle driver to call for his attention (Step S906). The warning may be directed to another vehicle or walking person approaching the own vehicle other than the own vehicle driver.

After the processing steps of S905 and S906, it is determined whether the abnormal condition (accident-certainty) is detected by the trigger detecting unit 404 (Step S907). Step S907 is determined by confirming whether the high image quality recording start trigger notifying the detected abnormal condition is outputted from the trigger detecting unit 404 to the first-fourth high image quality coding units 406, 409, 412, and 415. When the detection of the abnormal condition is confirmed (when the output of the high image quality recording start trigger is confirmed), the first-fourth high image quality data storage units 407, 410, 413, and 416 keep all of the first-fourth high-quality compressed moving image data earlier and later by a by given period of time on time axis than a time point when the trigger is confirmed (Step S908). After a given period of time passed while failing to confirm the high image quality recording start trigger, the first-fourth high image quality data storage units 407, 410, 413, and 416 do not store but discard the first-fourth high-quality compressed moving image data (Step S909). In Step S606, the storage of the high-quality compressed moving image data starts at the time point earlier by the given period of time than the timing of detecting the high image quality recording start trigger as described earlier.

As described so far, according to the present exemplary embodiment wherein the plurality of camera units are used to record the peripheral circumstances of the vehicle, the surroundings of the vehicle immediately before and after the occurrence of an accident can be photographed in all directions, and the high-quality compressed moving image data obtained therefrom can be recorded. The high-quality compressed moving image data thus reflecting the detailed information can help to analyze what caused the accident. When the vehicle is running in normal condition, the normal image quality recording is employed to effectively utilize the storage capacities of the storage units. The present exemplary embodiment is further advantageous in that the compression codec, bit rate, and angle of view are changed as well as the frame rate and GOP structure to record the high-quality compressed moving image data, so that the image quality of the moving image data can be further improved. It is further advantageous in that the driver is forewarned of the detected abnormal condition (attention-seeking) so that a possible accident is prevented from happening.

In the structure according to the present exemplary embodiment, four camera units are provided in the front, back and two side sections of the vehicle, however, the number of the camera units and where they should be located are not necessarily limited to the given examples.

The warning issued by the danger forewarning unit 405 described in the present exemplary embodiment is not necessarily limited to the given examples.

Exemplary Embodiment 5

An exemplary embodiment 5 of the present invention describes an in-vehicle moving image data recording apparatus 1E equipped with the following technical advantages to more clearly know the surroundings of the own vehicle:

moving image data supplied from a plurality of camera units provided in front, back, and two side sections of a vehicle are subject to two different compression processes which are normal image quality compression, and high image quality compression;

when the abnormal condition is detected, storage units store therein all of the high-quality compressed moving image data from a time point earlier by a given period of time than a time point when the abnormal condition is detected onwards; and images based on moving image data obtained by all of camera units are displayed on a display screen set at such a position that a vehicle driver find it easy to watch.

Figure 10:
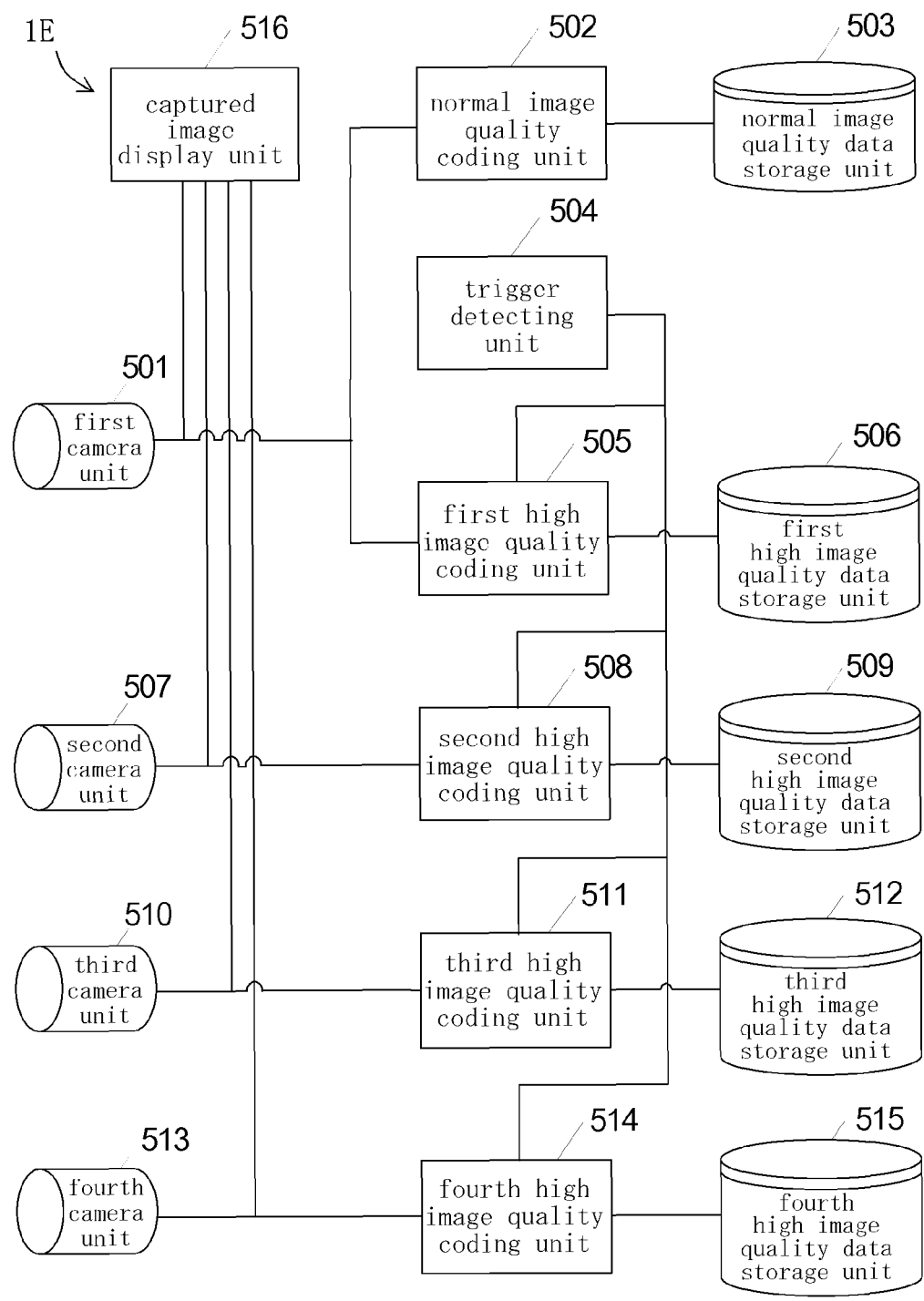
FIG. 10 is a block diagram illustrating a structure of an in-vehicle moving image data recording apparatus according to an exemplary embodiment 5 of the present invention.

FIG. 10 is a block diagram illustrating a structure of the in-vehicle moving image data recording apparatus 1E.

According to the present exemplary embodiment, four camera units, for example, are provided in the front, back and two side sections of the vehicle. The in-vehicle moving image data recording apparatus 1E has a first camera unit 501, a normal image quality coding unit 502, a normal image quality data storage unit 503, a trigger detecting unit 504, a first high image quality coding unit 505, a first high image quality data storage unit 506, a second camera unit 507 a second high image quality coding unit 508, a second high image quality data storage unit 509, a third camera unit 510, a third high image quality coding unit 511, a third high image quality data storage unit 512, a fourth camera unit 513, a fourth high image quality coding unit 514, a fourth high image quality data storage unit 515, and a captured image display unit 516.

The first camera unit 501, normal image quality coding unit 502, and normal image quality data storage unit 503 are structurally similar to the first camera unit 201, normal image quality coding unit 202, and normal image quality data storage unit 203 according to the exemplary embodiment 2 described earlier.

The first high image quality coding unit 505 compresses first moving image data obtained by the first camera unit 501 with high image quality. The first high image quality data storage unit 506 records therein the first high-quality compressed moving image data outputted from the first high image quality coding unit 505 based on a timing by which a high image quality recording start trigger is outputted from the trigger detecting unit 504. The first high image quality coding unit 505 and the first high image quality data storage unit 506 are structurally similar to the first high image quality coding unit 205 and the first high image quality data storage unit 206 according to the exemplary embodiment 2 described earlier.

The second high image quality coding unit 508 compresses second moving image data obtained by the second camera unit 507 with high image quality. The second high image quality data storage unit 509 records therein the second high-quality compressed moving image data outputted from the second high image quality coding unit 508 based on the timing by which the trigger detecting unit 504 outputs the high image quality recording start trigger. The second camera unit 507, second high image quality coding unit 508, and second high image quality data storage unit 509 are structurally similar to the second camera unit 207, second high image quality coding unit 208 and the second high image quality data storage unit 209 according to the exemplary embodiment 2 described earlier.

The third high image quality coding unit 511 compresses third moving image data obtained by the third camera unit 510 with high image quality. The third high image quality data storage unit 512 records therein the third high-quality compressed moving image data outputted from the third high image quality coding unit 511 based on the timing by which the trigger detecting unit 504 outputs the high image quality recording start trigger. The third camera unit 510, third high image quality coding unit 511, and third high image quality data storage unit 512 are structurally similar to the third camera unit 210, third high image quality coding unit 211, and third high image quality data storage unit 212 according to the exemplary embodiment 2 described earlier.

The fourth high image quality coding unit 514 compresses fourth moving image data obtained by the fourth camera unit 513 with high image quality. The fourth high image quality data storage unit 515 records therein the fourth high-quality compressed moving image data outputted from the fourth high image quality coding unit 514 based on the timing by which the trigger detecting unit 504 outputs the high image quality recording start trigger. The fourth camera unit 513, fourth high image quality coding unit 514, and fourth high image quality data storage unit 515 are structurally similar to the fourth camera unit 213, fourth high image quality coding unit 214 and the fourth high image quality data storage unit 215 according to the exemplary embodiment 2 described earlier.

The trigger detecting unit 504 is provided to detect the abnormal condition which possibly happens when the vehicle is travelling, and structurally similar to the trigger detecting unit 204 according to the exemplary embodiment 2 described earlier. The captured image display unit 516 displays first-fourth moving image data obtained by the first-fourth camera units 501, 507, 510, and 513 on a display screen. The captured image display unit 516 may, for example, divide the display screen into four divisions to display all of the first-fourth moving image data thereon at a time, display a panoramic image obtained by connecting all of images obtained around the vehicle, or delete background images to display only a key object such as traffic signal, vehicle, motor bike, or person involved.

The captured image display unit 516 may include or may not include a display device. The captured image display unit 516 can be configured by a display device driver software or a display device driver software and a display device.

Figure 11:
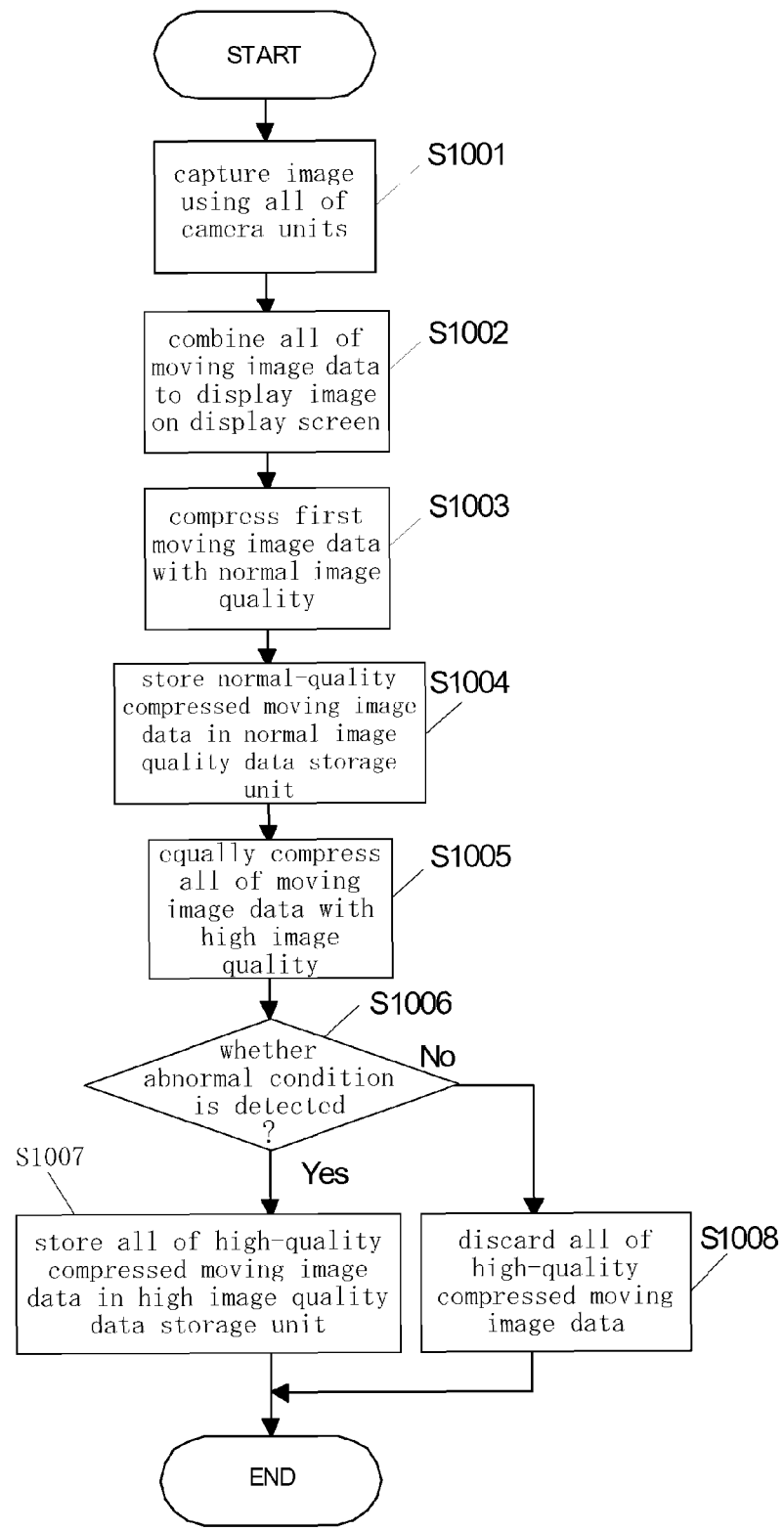
FIG. 11 is a flow chart illustrating an operation of the in-vehicle moving image data recording apparatus according to the exemplary embodiment 5.

Next, the operation of the in-vehicle moving image data recording apparatus 1E is described referring to a flow chart illustrated in FIG. 11. First, the first-fourth camera units 501, 507, 510, and 513 mounted in front, back, and two side sections of a vehicle photograph the circumstances around the vehicle (Step S1001). Next, the captured image display unit 516 generates first-fourth moving image data based on first-fourth moving image data generated by the first-fourth camera units 501, 507, 510, and 513 by taking the images, and further generates first-fourth images from the first-fourth moving image data and display the generated images on the display screen (Step S1002). Then, the normal image quality coding unit 502 compresses the first moving image data obtained by the first camera unit 501 mounted in the front section of the vehicle with normal image quality (Step S1003). The normal image quality data storage unit 503 stores therein the normal-quality compressed moving image data outputted from the normal image quality coding unit 502 (Step S1004). The first-fourth moving image data outputted from the first-fourth camera units 501, 507, 510, and 513 are compressed by the first-fourth high image quality coding units 505, 508, 511, and 514 to meet the following requirements (Step S1005):

high image quality codec
high bit rate
high frame rate
better image quality on a large display screen Next, it is determined whether the abnormal condition (for example, another vehicle in too proximity quite possibly colliding with the own vehicle, walking person in too proximity, sudden braking, or physical impact on the own vehicle) is detected by the trigger detecting unit 504 (Step S1006). Step S1006 is determined by confirming whether the high image quality recording start trigger notifying the detected abnormal condition is outputted from the trigger detecting unit 504 to the first-fourth high image quality coding units 505, 508, 511, and 514. When the detection of the abnormal condition is confirmed (when the output of the high image quality recording start trigger is confirmed), the first-fourth high image quality data storage units 506, 509, 512, and 515 keep all of the first-fourth high-quality compressed moving image data earlier and later by a given period of time on time axis than a time point when the trigger is confirmed (Step S1007).

After a given period of time passed while failing to confirm the high image quality recording start trigger, the first-fourth high image quality data storage units 506, 509, 512, and 515 do not store but discard the first-fourth high-quality compressed moving image data (Step S1008). In Step S1007, the storage of the high-quality compressed moving image data starts at the time point earlier by the given period of time than the timing of detecting the high image quality recording start trigger as described earlier.

Figure 12:
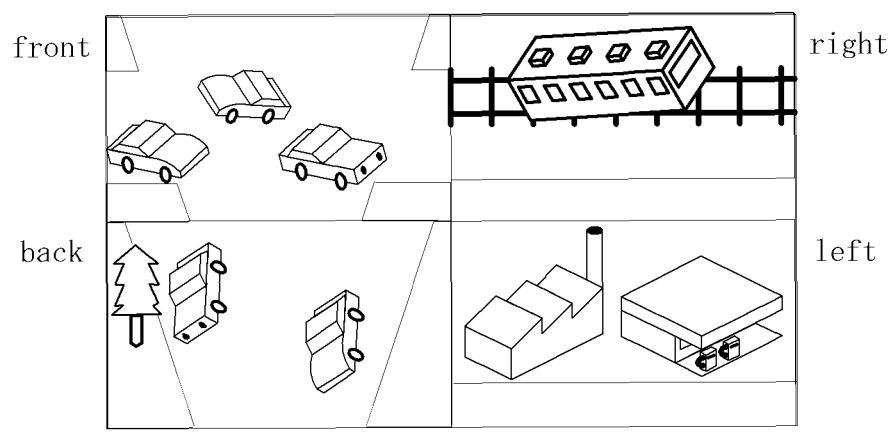
FIG. 12 is a conceptual rendering of an image displayed by a captured image display unit.
Figure 13:
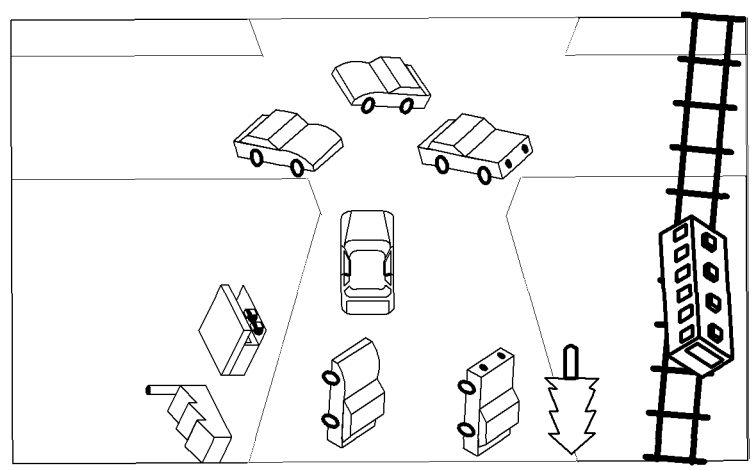
FIG. 13 is a conceptual rendering of an image displayed by the captured image display unit.

FIGS. 12 and 13 are conceptual renderings of images displayed by the captured image display unit 516. The captured image display unit 516 combines the first-fourth moving image data outputted from the first-fourth camera units 501, 507, 510, and 513 to generate the combined moving image data, and converts the combined moving image data into images and displays the obtained images on a display screen 516a of the captured image display unit 516. To make it easier to visually confirm the circumstances around the vehicle, the combined moving image data may directly display the first-fourth moving image data obtained in the front, back and two side sections of the vehicle in four divisions of the screen (see the display example illustrated in FIG. 12), or the first-fourth moving image data may be combined into a panoramic image (see the display example illustrated in FIG. 13).

As described so far, according to the present exemplary embodiment wherein the plurality of camera units are used to record the peripheral circumstances of the vehicle, the surroundings of the vehicle immediately before and after the occurrence of an accident can be photographed in all directions, and the high-quality compressed moving image data obtained therefrom can be recorded. The high-quality compressed moving image data thus reflecting the detailed information can help to analyze what caused the accident. When the vehicle is travelling in normal condition, the normal-quality compressed moving image data is recorded to fully utilize the storage capacities of the storage units. The present exemplary embodiment is further advantageous in that the compression codec, bit rate, and angle of view are changed as well as the frame rate and GOP structure to record the high-quality compressed moving image data, so that the image quality of the moving image data can be further improved. It is further advantageous in that the images generated from the moving image data obtained by the plurality of camera units are displayed on the display screen by the captured image display unit 516 so that the driver can figure out the condition of the road where he is driving to prevent any possible accident i from happening.

In the structure according to the present exemplary embodiment, four camera units are provided in the front, back and two side sections of the vehicle, however, the number of the camera units and where they should be located are not necessarily limited to the given examples. Further, the present exemplary embodiment illustrated some examples of the image displayed by the captured image display unit 516, however, the image is not necessarily limited to the given examples.

Modified Embodiments

So far were described the in-vehicle moving image data recording apparatus according to the invention based on the exemplary embodiments 1-5. However, the present invention is not necessarily limited to these described embodiments. Below are given a few suggested modified embodiments.

The in-vehicle moving image data recording apparatus according to the invention can be configured by either hardware or software. The apparatus may mixedly include some structural components processed by hardware and other structural elements processed by software.

The exemplary embodiments described the coding format examples in the normal image quality compression and high image quality compression. The normal image quality compression and high image quality compression, however, are not necessarily limited to the given examples.

The exemplary embodiments described the various sensors as the trigger detecting unit, however, the trigger detecting unit is not necessarily limited to the given examples.

In the description of the exemplary embodiments, the moving image data is continuously coded to generate the normal-quality compressed moving image data during the recording of the high-quality compressed moving image data. The generation of the normal-quality compressed moving image data may be suspended during the recording of the high-quality compressed moving image data.

The recording of the high-quality compressed moving image data may end in a given period of time after it started, or may end as soon as it is known from the result of, for example, the acceleration sensor that the vehicle is running in normal condition again.

The processing steps (functions) of the in-vehicle moving image data recording apparatus according to the invention may be carried out by a single centralized control apparatus (system), or may be carried out in a distributed manner by a plurality of apparatuses.

Industrial Applicability

As described thus far, the in-vehicle moving image data recording apparatus according to the invention comprising the normal image quality coding unit and the high image quality coding unit is technically advantageous in that the capacity of the storage memory can be effectively used when the vehicle is running in normal condition, and the moving image data with high image quality can be obtained immediately after an accident occurs. The in-vehicle moving image data recording apparatus thus technically characterized is advantageously used as, for example, a drive recorder or an event recorder.

DESCRIPTION OF REFERENCE SYMBOLS 101, 301 camera unit
102, 202, 304, 402, 502 normal image quality coding unit
103, 203, 305, 403, 503 normal image quality data storage unit
104, 204, 306, 404, 504 trigger detecting unit
105, 307, 406 high image quality coding unit
106, 308 high image quality data storage unit
201, 401, 501 first camera unit
205, 406, 505 first high image quality coding unit
206, 407, 506 first high image quality data storage unit
207, 408, 507 second camera unit
208, 409, 508 second high image quality coding unit
209, 410, 509 second high image quality data storage unit
210, 411, 510 third camera unit
211, 412, 511 third high image quality coding unit
212, 413, 512 third high image quality data storage unit
213, 414, 513 fourth camera unit
214, 415, 514 fourth high image quality coding unit
215, 416, 515 fourth high image quality data storage unit
302 acceleration sensor
303 number plate detecting unit
308 high image quality data storage unit
405 danger forewarning unit
516 captured image display unit

What is claimed is:

1. An in-vehicle moving image data recording apparatus mounted in a vehicle, comprising:
   a normal image quality coding unit for compressing moving image data constantly generated from images of surroundings of the vehicle captured by a camera unit mounted in the vehicle with a normal image quality to constantly generate a normal-quality compressed moving image data;
   a high image quality coding unit for compressing the moving image data with an image quality higher than the normal image quality to constantly generate a high-quality compressed moving image data;
   a normal image quality data storage unit for recording therein the normal-quality compressed moving image data;
   a trigger detecting unit for detecting an abnormal condition which possibly happens to the vehicle currently travelling; and
   a high image quality data storage unit for constantly recording therein the high-quality compressed moving image data outputted by the high image quality coding unit and storing the high-quality moving image data based on a trigger detection timing by the trigger detecting unit,
   wherein the normal-quality compressed moving image data is recorded when the high-quality compressed moving image data is recorded.

2. The in-vehicle moving image data recording apparatus as claimed in claim 1, further including the camera unit.

3. The in-vehicle moving image data recording apparatus as claimed in claim 1, wherein the high image quality data storage unit records all of the high-quality compressed moving image data from a time point earlier by a given period of time than the detection timing onwards.

4. The in-vehicle moving image data recording apparatus as claimed in claim 3, wherein
   the high image quality coding unit can constantly generate the high-quality compressed moving image data and supply the generated high-quality compressed moving image data to the high image quality data storage unit,
   the high image quality data storage unit overwrites the high-quality compressed moving image data initially stored in a storage capacity of the storage unit with the high-quality compressed moving image data most recently inputted to the storage unit beyond the storage capacity, and
   the high image quality data storage unit does not delete the high-quality compressed moving image data by overwriting but stores the high-quality compressed moving image data from the time point earlier by the given period of time than the detection timing onwards.

5. The in-vehicle moving image data recording apparatus as claimed in claim 2, wherein the camera unit includes a plurality of camera units which respectively capture images in different directions from the vehicle,
   the high image quality coding unit compresses a plurality of the moving image data generated by the plurality of camera units with the high image quality to generate a plurality of the high-quality compressed moving image data, and
   the high image quality data storage unit records therein the plurality of the high-quality compressed moving image data based on the detection timing.

6. The in-vehicle moving image data recording apparatus as claimed in claim 5, wherein the trigger detecting unit can recognize a direction of occurrence of the abnormal condition, and when the trigger detecting unit detects the abnormal condition, the high image quality data storage unit selectively records therein the moving image data obtained by any of the camera units which can photograph the images of the surroundings in the direction of occurrence of the abnormal condition.

7. The in-vehicle moving image data recording apparatus as claimed in claim 1, further comprising:

a number plate detecting unit for detecting a number plate image region including a number plate of another vehicle running near the vehicle in the moving image data; and an acceleration sensor unit for sensing an acceleration of the vehicle, wherein the number plate detecting unit performs motion prediction of the number plate based on the acceleration sensed by the acceleration sensor unit to detect the number plate image region based on the motion prediction, and the high image quality coding compresses the number plate image region with an image quality higher than the normal image quality to generate a high-quality compressed number plate image region as the high-quality compressed moving image data.

8. The in-vehicle moving image data recording apparatus as claimed in claim 1, further comprising a danger forewarning unit which issues a warning to a driver of the vehicle depending on the abnormal condition detected by the trigger detecting unit.

9. The in-vehicle moving image data recording apparatus as claimed in claim 1, further comprising a captured image display unit which displays the moving image data on a display screen.

10. The in-vehicle moving image data recording apparatus as claimed in claim 1, wherein the trigger detecting unit detects at least one of; another vehicle in too proximity, walking person in too proximity, sudden braking, and physical impact on the vehicle as the abnormal condition.

11. The in-vehicle moving image data recording apparatus as claimed in claim 1, wherein the trigger detecting further includes:

a detection sensor provided on one side end of a road where the vehicle is travelling to detect the abnormal condition which possibly happens to the vehicle travelling on the road and transmit a wireless signal; and a reception apparatus provided in the vehicle to receive the wireless signal.

12. The in-vehicle moving image data recording apparatus as claimed in claim 1, wherein at least one of image codec, angle of view, frame rate, and bit rate is set to have an image quality higher than the normal-quality compressed moving image data in the high-quality compressed moving image data.

13. An in-vehicle moving image data recording apparatus mounted in a vehicle, comprising:

a normal image quality coding unit for compressing moving image data generated from images of surroundings of the vehicle captured by a camera unit mounted in the vehicle with a normal image quality to generate a normal-quality compressed moving image data;

a high image quality coding unit for compressing the moving image data with an image quality higher than the normal image quality to generate a high-quality compressed moving image data;

a normal image quality data storage unit for recording therein the normal-quality compressed moving image data;

a trigger detecting unit for detecting an abnormal condition which possibly happens to the vehicle currently travelling;

a high image quality data storage unit for recording therein the high-quality compressed moving image data based on a timing by which the abnormal condition is detected by the trigger detecting unit;

a number plate detecting unit for detecting a number plate image region including a number plate of another vehicle running near the vehicle in the moving image data; and an acceleration sensor unit for sensing an acceleration of the vehicle, wherein the number plate detecting unit performs motion prediction of the number plate based on the acceleration sensed by the acceleration sensor unit to detect the number plate image region based on the motion prediction, and the high image quality coding compresses the number plate image region with an image quality higher than the normal image quality to generate a high-quality compressed number plate image region as the high-quality compressed moving image data.

14. An in-vehicle moving image data recording apparatus mounted in a vehicle, comprising:

a normal image quality coding unit for compressing moving image data generated from images of surroundings of the vehicle captured by a camera unit mounted in the vehicle with a normal image quality to constantly generate a normal-quality compressed moving image data;

a high image quality coding unit for compressing the moving image data with an image quality higher than the normal image quality to constantly generate a high-quality compressed moving image data;

a normal image quality data storage unit for recording therein the normal-quality compressed moving image data;

a trigger detecting unit for detecting an abnormal condition which possibly happens to the vehicle currently travelling;

a high image quality data storage unit for constantly recording therein the high-quality compressed moving image data outputted by the high image quality coding unit and storing the high-quality moving image data based on a trigger detection by the trigger detecting unit; and a danger forewarning unit which issues a warning to a driver of the vehicle depending on the abnormal condition detected by the trigger detecting unit, wherein the normal-quality compressed moving image data is recorded when the high-quality compressed moving image data is recorded.

15. An in-vehicle moving image data recording apparatus mounted in a vehicle, comprising:

a normal image quality coding unit for compressing moving image data generated from images of surroundings of the vehicle captured by a camera unit mounted in the vehicle with a normal image quality to constantly generate a normal-quality compressed moving image data;

a high image quality coding unit for compressing the moving image data with an image quality higher than the normal image quality to constantly generate a high-quality compressed moving image data;

a normal image quality data storage unit for recording therein the normal-quality compressed moving image data;

a trigger detecting unit for detecting an abnormal condition which possibly happens to the vehicle currently travelling;

a high image quality data storage unit for constantly recording therein the high-quality compressed moving image data outputted by the high image quality coding unit and storing the high-quality moving image data based on a trigger detection timing by the trigger detecting unit; and a captured image display unit which displays the moving image data on a display screen, wherein the normal-quality compressed moving image data is recorded when the high-quality compressed moving image data is recorded.

* * * * *